United States Patent
Choi et al.

(10) Patent No.: US 11,929,080 B2
(45) Date of Patent: Mar. 12, 2024

(54) ELECTRONIC DEVICE AND METHOD FOR PROVIDING MEMORY SERVICE BY ELECTRONIC DEVICE

(71) Applicant: Samsung Electronics Co., Ltd., Suwon-si (KR)

(72) Inventors: Woojei Choi, Suwon-si (KR); Dongseop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/298,498

(22) PCT Filed: May 11, 2021

(86) PCT No.: PCT/KR2021/005856
§ 371 (c)(1),
(2) Date: May 28, 2021

(87) PCT Pub. No.: WO2022/124493
PCT Pub. Date: Jun. 16, 2022

(65) Prior Publication Data
US 2022/0335954 A1    Oct. 20, 2022

(30) Foreign Application Priority Data

Dec. 10, 2020  (KR) .................. 10-2020-0171985

(51) Int. Cl.
*G10L 17/24*    (2013.01)
*G06F 21/31*    (2013.01)
(Continued)

(52) U.S. Cl.
CPC .............. *G10L 17/24* (2013.01); *G06F 21/31* (2013.01); *G06F 21/32* (2013.01);
(Continued)

(58) Field of Classification Search
CPC ......... G10L 17/24; G10L 15/22; G10L 17/04; G10L 17/06; G06F 21/31; G06F 21/32;
(Continued)

(56) References Cited

U.S. PATENT DOCUMENTS 7,127,398 B1 * 10/2006 Yamagishi .......... G10L 15/1822
704/E15.04
2006/0006220 A1 * 1/2006 Kwon ..................... G06F 21/10
235/382

(Continued)

FOREIGN PATENT DOCUMENTS

| CN | 109637520 A | 4/2019 |
| JP | 2001-125900 A | 5/2001 |

(Continued)

OTHER PUBLICATIONS

International Search Report and Written Opinion of the International Searching Authority in connection with International Application No. PCT/KR2021/005856 dated Aug. 30, 2021, 14 pages.

*Primary Examiner* — Edwin S Leland, III

(57) ABSTRACT

According to an embodiment, an electronic device comprises a communication module, a memory, and a processor configured to, upon obtaining a first utterance related to a memory service, prepare to store first information for the memory service for the first utterance and store the first information including essential information, sensitivity information for the first information, and an authentication method for the first information, detected from the first utterance, in the memory, and obtain a second utterance for looking up information related to the memory service, upon identifying that the obtained second utterance is one for looking up the first information, complete authentication based on the authentication method, and provide the essen- (Continued)

tial information by a providing method determined based on the sensitivity information. Various other embodiments may be provided.

13 Claims, 15 Drawing Sheets

(51) Int. Cl.
    *G06F 21/32*         (2013.01)
    *G06F 21/62*         (2013.01)
    *G06F 21/78*         (2013.01)
    *G06F 21/84*         (2013.01)
    *G10L 15/22*         (2006.01)
    *G10L 17/04*         (2013.01)
    *G10L 17/06*         (2013.01)
    *H04L 12/28*         (2006.01)

(52) U.S. Cl.
    CPC .......... *G06F 21/6245* (2013.01); *G06F 21/78* (2013.01); *G06F 21/84* (2013.01); *G10L 15/22* (2013.01); *G10L 17/04* (2013.01); *G10L 17/06* (2013.01); *H04L 12/2809* (2013.01); *H04L 12/2823* (2013.01); *H04L 12/2829* (2013.01)

(58) Field of Classification Search
    CPC ...... G06F 21/6245; G06F 21/78; G06F 21/84; H04L 12/2809; H04L 12/2823; H04L 12/2829
    USPC ......................................................... 704/246
    See application file for complete search history.

(56) References Cited

U.S. PATENT DOCUMENTS

| | | | | |
|---|---|---|---|---|
| 2008/0189553 | A1* | 8/2008 | Eppert | G06F 21/31 713/183 |
| 2010/0031020 | A1* | 2/2010 | Goldstein | G06F 21/6245 713/153 |
| 2012/0079265 | A1* | 3/2012 | Ferren | G06Q 20/40145 707/790 |
| 2015/0081295 | A1* | 3/2015 | Yun | G10L 17/24 704/244 |
| 2015/0133084 | A1* | 5/2015 | Baek | G06V 40/50 455/411 |
| 2016/0034709 | A1* | 2/2016 | Englehardt | G06F 21/6245 726/28 |
| 2016/0098734 | A1* | 4/2016 | Chou | G06F 21/6245 705/7.29 |
| 2016/0308686 | A1* | 10/2016 | Vijayrao | H04L 12/282 |
| 2018/0189510 | A1* | 7/2018 | Seko | H04W 12/06 |
| 2019/0080168 | A1* | 3/2019 | Nowak-Przygodzki | G06F 3/017 |
| 2019/0215182 | A1* | 7/2019 | Lee | H04L 12/2825 |
| 2019/0279615 | A1* | 9/2019 | Ben-Dor | G10L 25/00 |
| 2020/0090662 | A1* | 3/2020 | Castro | H04R 1/028 |
| 2020/0194008 | A1 | 6/2020 | Lee et al. | |
| 2021/0097158 | A1* | 4/2021 | Lee | G10L 17/24 |
| 2021/0173960 | A1* | 6/2021 | Dao | H04W 12/71 |
| 2022/0191214 | A1* | 6/2022 | Aoki | G06Q 30/01 |
| 2022/0335954 | A1* | 10/2022 | Choi | G06F 21/31 |

FOREIGN PATENT DOCUMENTS

| | | |
|---|---|---|
| JP | 2014-182270 A | 9/2014 |
| KR | 10-2005-0028379 A | 3/2005 |
| KR | 10-2006-0005284 A | 1/2006 |
| KR | 10-2016-0055839 A | 5/2016 |
| KR | 10-2016-0137948 A | 12/2016 |
| KR | 10-2019-0087798 A | 7/2019 |
| KR | 10-2020-0007012 A | 1/2020 |
| KR | 10-2020-0008708 A | 1/2020 |
| KR | 10-2020-0073718 A | 6/2020 |
| KR | 10-2020-0095719 A | 8/2020 |

\* cited by examiner

ELECTRONIC DEVICE AND METHOD FOR PROVIDING MEMORY SERVICE BY ELECTRONIC DEVICE

CROSS-REFERENCE TO RELATED APPLICATIONS

This application is a National Phase Entry of PCT International Application No. PCT/KR2021/005856, which was filed on May 11, 2021, and claims priority to Korean Patent Application No. 10-2020-0171985, which was filed on Dec. 10, 2020, the disclosures of which are herein incorporated by reference in their entirety.

BACKGROUND

1. Field

Various embodiments relate to an electronic device capable of providing stored memory information at a request of a user while maintaining security and a method for providing a memory service by the electronic device.

2. Description of Related Art

Portable digital communication devices have become a must-have item for everyone in modern era. Customers desire to receive various high-quality services anytime, anywhere using their portable digital communication devices.

The speech recognition service is a service that provides customers with various content services corresponding to the user's speech received based on a speech recognition interface implemented on portable digital communication devices. In order to provide speech recognition services, portable digital communication devices are implemented with technologies that recognize and analyze human language (e.g., automatic speech recognition, natural language understanding, natural language generation, machine translation, dialogue system, question and answer, speech recognition/synthesis).

Further, the user may store various pieces of information to be memorized by the user by using a speech service in an electronic device (e.g., an edge electronic device) that manages home devices and then receive the memory information when needed.

Memory information stored by the user in an electronic device (e.g., an edge electronic device) that manages home devices may be stored in a cloud and leaked to the outside and may be easily identified by another user's utterance request. Resultantly, if the memory information stored by the user in the electronic device (e.g., an edge electronic device) that manages home devices is sensitive personal information, the personal information may be exposed as it is.

Various embodiments relate to an electronic device capable of providing stored memory information at a user's request while maintaining security and a method for providing a memory service by the electronic device.

SUMMARY

According to an embodiment, an electronic device comprises a communication module, a memory, and a processor configured to, upon obtaining a first utterance related to a memory service, prepare to store first information for the memory service for the first utterance and store the first information including essential information, sensitivity information for the first information, and an authentication method for the first information, detected from the first utterance, in the memory, and obtain a second utterance for looking up information related to the memory service, upon identifying that the obtained second utterance is one for looking up the first information, complete authentication based on the authentication method, and provide the essential information by a providing method determined based on the sensitivity information.

According to an embodiment, a method for providing a memory service by an electronic device comprises, upon obtaining a first utterance related to a memory service, preparing to store first information for the memory service for the first utterance and storing the first information including essential information, sensitivity information for the first information, and an authentication method for the first information, detected from the first utterance, obtaining a second utterance for looking up information related to the memory service, upon identifying that the obtained second utterance is one for looking up the first information, completing authentication based on the authentication method, and providing the essential information by a providing method determined based on the sensitivity information.

According to various embodiments, the electronic device may limit leakage or access to personal memory information for the user by providing stored memory information at the request of the user while maintaining security.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
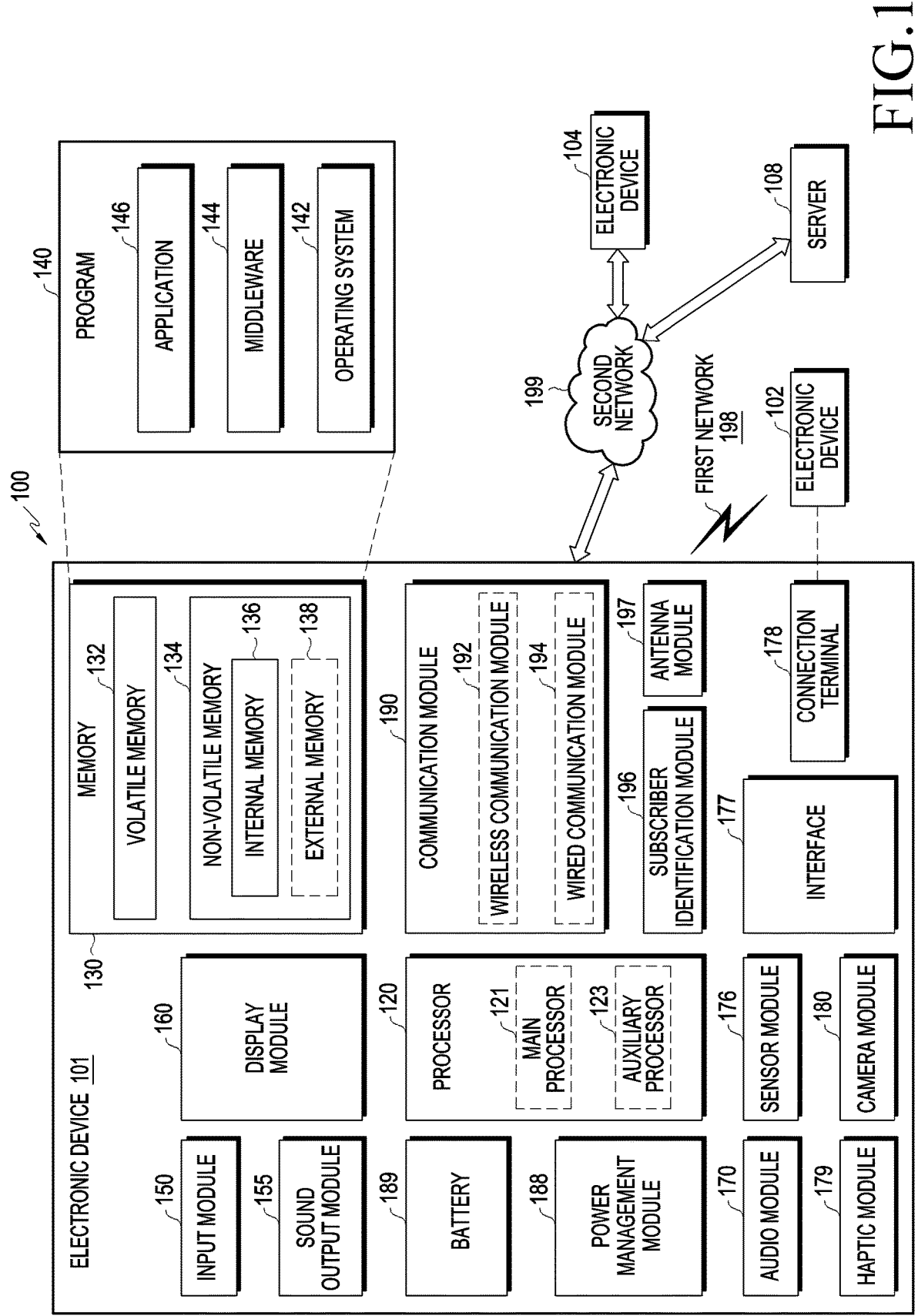
FIG. 1 illustrates a block diagram of an electronic device in a network environment according to an embodiment of this disclosure.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
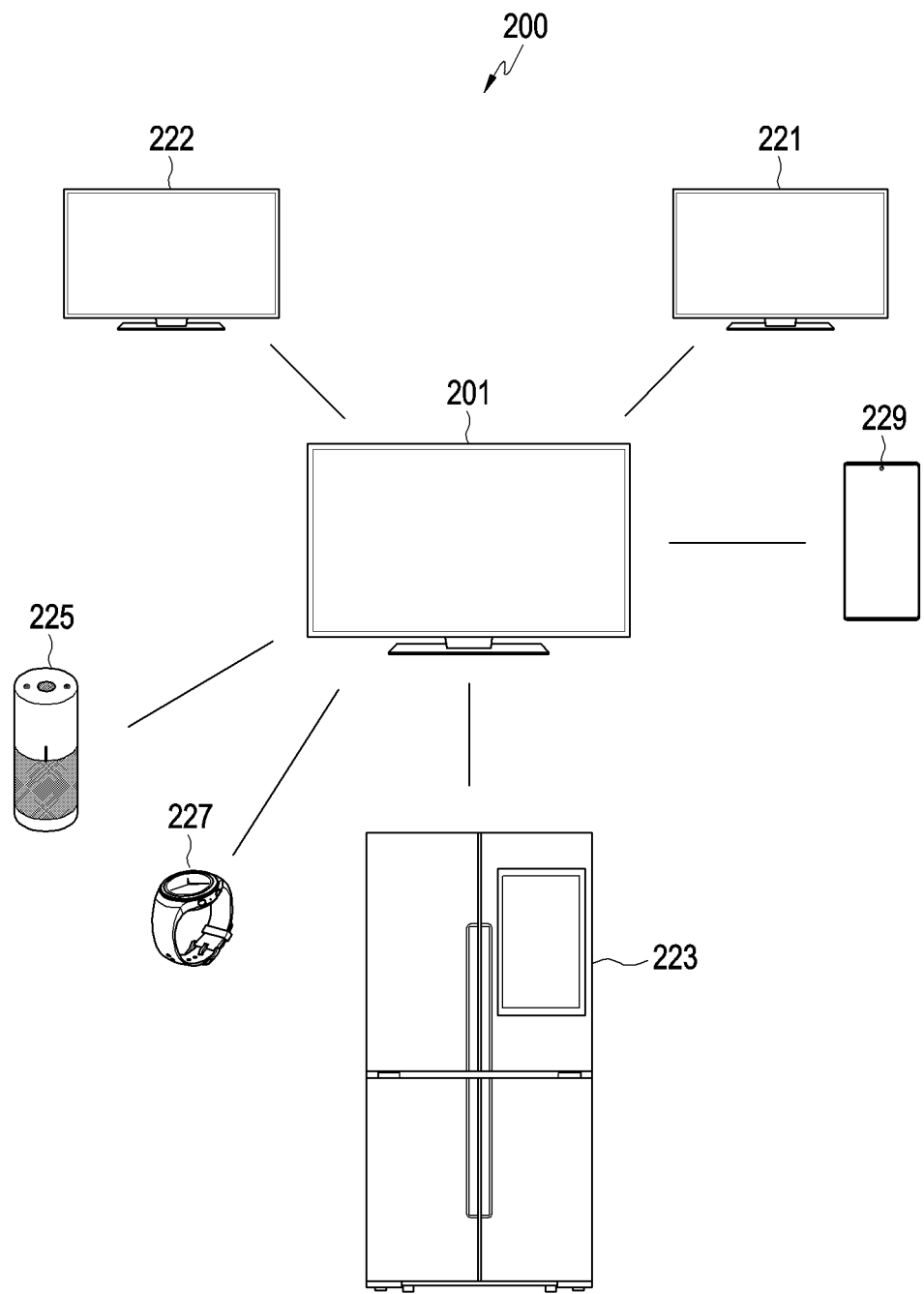
FIG. 2 illustrates an a view illustrating operation of controlling a plurality of devices in a home by an electronic device according to an embodiment of this disclosure.

FIG. 2 illustrates a view 200 illustrating operations for controlling a plurality of devices in a home by an electronic device according to an embodiment of this disclosure.

Referring to FIG. 2, a home may include a plurality of devices 221 to 229 and an electronic device 201 capable of managing the plurality of devices.

According to an embodiment, the electronic device 201 may be a primary device capable of performing a home IoT edge function, and the electronic device 201 may manage the plurality of devices while transmitting and receiving information to/from each of the plurality of devices 221 to 229, with communication established with the plurality of devices 221 to 229.

According to an embodiment, the electronic device 201 and the plurality of devices 221 to 229 may include all or some of the components of the electronic device 101 of FIG. 1.

According to an embodiment, at least one of the plurality of devices 221 to 229 may be set as a primary device capable of performing a home IoT edge function.

According to an embodiment, at least one of the non-portable devices (e.g., TV devices 201, 221, and 222, a refrigerator 223, and an artificial intelligence (AI) speaker 225) among various devices 201 and 221 to 229 in the home may be set as the primary device capable of performing a home IoT edge function.

According to an embodiment, upon obtaining a first utterance related to a memory service, an electronic device 201 may prepare to store first information for the memory service for the first utterance and store the first information. The first information can include essential information obtained from the first utterance, sensitivity information determined for the first information, and an authentication method determined for the first information.

According to an embodiment, upon directly obtaining the user's first utterance, the electronic device 201 may process the first utterance into text data using automatic speech recognition (ASR).

According to an embodiment, the electronic device 201 may detect first essential information indicating the target to be memorized in the first utterance and second essential information indicating a state value of the target to be memorized, as the essential information, and include the detected information in the first information.

According to an embodiment, when the first utterance includes disclosure target information, the electronic device 201 may set a sensitivity level corresponding to the disclosure target information by referring to a sensitivity word database (DB), generate the sensitivity information, and include the generated sensitivity information in the first information.

According to an embodiment, unless the first utterance includes the disclosure target information, the electronic device 201 may set a sensitivity level corresponding to at least one word included in the first utterance by referring to the sensitivity word DB and include the sensitivity information in the first information.

According to an embodiment, the electronic device 201 may include at least one piece of user information, disclosure target information, or password information included in the first information and may generate an authentication method by a combination of at least one of the piece user information, disclosure target information, or password information included in the first information.

According to an embodiment, the electronic device 201 may obtain a second utterance for looking up information related to the memory service and, upon identifying that the second utterance is a second utterance for looking up the first information (e.g., memory information) stored in the memory service, complete the authentication by the authentication method included in the first information, determine a providing method based on the sensitivity information included in the first information, and provide the essential information included in the first information by the determined providing method.

According to an embodiment, upon directly obtaining the user's second utterance, the electronic device 201 may process the second utterance into text data using automatic speech recognition (ASR).

According to an embodiment, the authentication method included in the first information may be generated by a combination of at least one piece of the user information, disclosure target information, or password information included in the first information and may be determined by, e.g., user information (e.g., speech identity (id) information), user information (e.g., speech ID information) and disclosure target information, or password information.

According to an embodiment, the electronic device 201 may provide essential information (e.g., the first essential information indicating the target to be memorized and the second essential information indicating the state value of the target to be memorized) included in the first information as the providing method (e.g., a providing method via a speaker, a providing method via a display, or an output method via a speaker and a display) corresponding to the sensitivity information included in the first information.

According to an embodiment, upon receiving a first utterance related to a memory service from a first device supporting a speech service among a plurality of devices 221 to 229 in the home, the electronic device 201 may prepare to store the first information for the memory service and, upon storing the first information corresponding to the first utterance, notify the first device that the first utterance has been completely stored.

According to an embodiment, the electronic device 201 may receive a second utterance for looking up information related to a memory service from the first device supporting a speech service among a plurality of devices 221 to 229 in the home and, upon identifying that the second utterance is a second utterance for looking up the first information (e.g., memory information) stored in the memory service, detect the first information corresponding to the second utterance and transmit the same to the first device.

According to an embodiment, upon obtaining a first utterance related to a memory service, the first device supporting a speech service among the plurality of devices 221 to 229 in the home may transmit the obtained first utterance to the electronic device 201

According to an embodiment, the first device may process the first utterance into text data using an automatic speech recognition (ASR) system and transmit the text data corresponding to the first utterance to the electronic device 201.

According to an embodiment, the first device may receive a message indicating that the first information has been completely stored from the electronic device 301 and notify the user who inputs the first utterance that the first information has been completely stored.

According to an embodiment, the first device supporting a speech service among the plurality of devices 221 to 229 in the home may obtain a second utterance for looking up information related to the memory information. Upon identifying that the second utterance is a second utterance for looking up the first information stored in the memory service, request the electronic device 201 to provide the first information and receive the first information from the electronic device 201.

According to an embodiment, the first device may process the second utterance into text data using an automatic speech recognition (ASR) system and transmit the text data corresponding to the second utterance to the electronic device 301.

According to an embodiment, upon receiving the first information from the electronic device 301, the first device may provide the received first information.

According to an embodiment, when authentication is complete by authentication method of the first information received from the electronic device 201, the first device may receive the sensitivity information of the first information and the essential information of the first information from the electronic device 201 and provide the essential information of the first information based on a providing method determined based on the sensitivity information.

According to an embodiment, the first device may receive the first information from the electronic device 201 and, upon completing authentication by authentication method of the first information included in the first information, provide the essential information of the first information included in the first information by the providing method determined based on the sensitivity information of the first information included in the first information.

Figure 3:
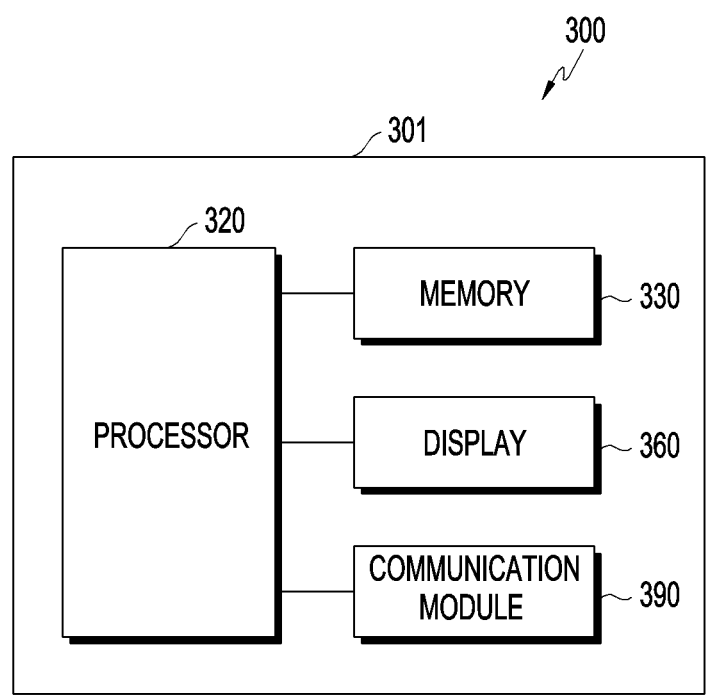
FIG. 3 illustrates a block diagram of an electronic device according to an embodiment of this disclosure.

FIG. 3 illustrates a block diagram 300 of an electronic device according to an embodiment of this disclosure.

Referring to FIG. 3, an electronic device 301 (e.g., the electronic device 101 of FIG. 1) may include a processor 320 (e.g., the processor 120 of FIG. 1), a memory 330 (e.g., the memory 130 of FIG. 1), a display 360 (e.g., the display module 160 of FIG. 1), and a communication module 390 (e.g., the communication module 190 of FIG. 1).

According to an embodiment, the processor 320 may control the overall operation of the electronic device 301.

According to an embodiment, the processor 320 may manage a plurality of devices (e.g., the plurality of devices 221 to 229 of FIG. 2) connected to the electronic device 301 through a network.

According to an embodiment, upon obtaining a first utterance related to a memory service, the processor 320 may prepare to store first information for the memory service for the first utterance and store the first information including essential information included in the first utterance, authentication method of the first information, and sensitivity information of the first information, in a memory service DB of the memory 330.

According to an embodiment, the processor 320 may obtain the first utterance from an electronic device 301 capable of supporting a speech service or a first device capable of a speech service among the plurality of home devices (e.g., the plurality of devices 221 to 229 of FIG. 2) connected with the electronic device.

According to an embodiment, upon detecting, e.g., "Memorize" or "Save" as a preset phrase to request a memory service from the utterance by analysis of the utterance, the processor 320 may determine that the utterance is the first utterance related to the memory service.

According to an embodiment, the processor 320 may, based on the analysis of the first utterance, detect first essential information indicating the target to be memorized in the first utterance and second essential information indicating the state value of the target to be memorized as essential information and detect disclosure target information for the first information and password information for the first information as non-essential information.

Upon detecting the disclosure target information for the first information from the first utterance, the processor 320 may analyze the speech of the user who has issued the first utterance when the first utterance is input. When a speech ID corresponding to the analyzed speech is present in a family member DB stored in the memory 330, the processor 320 may detect the user corresponding to the speech ID and set the detected user as the disclosure target.

For example, upon obtaining the first utterance saying, "Memorize the entry door password 1234 as the password value 0000 so as to be known only to me," the processor 320 may detect "entry door password" as the first essential information, "1234" as the second essential information, "so as to be known only to me" as the disclosure target information, and "password value 0000" as the password information. The processor 320 may analyze the speech of the user who has issued the first utterance and, upon determining that the speech ID corresponding to the analyzed speech is the speech ID of the son by referring to the family member DB stored in the memory 330, identifies "me" as "son" and include the "son" as the disclosure target information of the first information.

For example, upon obtaining the first utterance saying, "Memorize Samsung bank account password as 9876," the processor 320 may detect "Samsung bank account password as the first essential information and "9876" as the second essential information.

According to an embodiment, unless the first utterance includes the disclosure target information for the first information, the processor 320 may generate at least one user corresponding to at least one device currently located in the home or the electronic device through which the first utterance has been input or at least one device located in the same space as the first device among the plurality of devices in the home as the disclosure target information and include the generated disclosure target information in the first information.

The processor 320 may automatically generate at least one user corresponding to at least one device connected with the electronic device via a network among the plurality of devices in the home, i.e., at least one currently present in the home, as the disclosure target information, and include the same in the first information. The processor may store the family member DB stored in the memory 330 and detect at least one user corresponding to at least one device currently present in the home based on the family member DB.

The processor 320 may automatically generate at least one user corresponding to at least one device capable of performing short-range communication (e.g., Bluetooth (BT) communication or ultra-wideband (UWB) communication) with the electronic device 301 through which the first utterance has directly been input or the first device among the plurality of devices in the home, i.e., at least one device currently presented in the same space (e.g., a room) as the electronic device 301 or the first device, as the disclosure target information, and include the same in the first information. The processor may detect at least one user corresponding to at least one device present in the same space (e.g., a room) as the electronic device 301 or the first device based on the family member DB.

The processor 320 may detect the device corresponding to the user present in the family member DB and the disclosure target information.

For example, upon detecting at least one device currently detected in the home based on the family member DB at the time of obtaining the first utterance as a device (e.g., a watch phone) registered as son and a device (e.g., a smartphone) registered as mom, the processor 320 may generate son and mom as the disclosure target information and include the generated disclosure target information in the first information.

For example, upon detecting at least one device connected via short-range communication in the same space (e.g., a room) as the first device or the electronic device 301 at the time of obtaining the first utterance as the device (e.g., a watch phone) registered as son, the processor 320 may generate son as the disclosure target information and include the generated disclosure target information in the first information.

According to an embodiment, when the first essential information detected from the first utterance includes a device name and a device state name, the processor 320 may obtain identification information (e.g., device ID information) about the device corresponding to the device name included in the first essential information among the plurality of devices (e.g., the plurality of devices 221 to 229 of FIG. 2) in the home and state information about the device corresponding to the device state name included in the first essential information and store the device identification information and the device state information as the second essential information of the first information. The processor 320 may detect at least one device corresponding to the device name included in the first essential information among the plurality of devices in the home and detect the device which is currently in an on state among the at least one detected device as the device corresponding to the device name included in the first essential information. When there are a plurality of devices which correspond to the device name included in the first essential information and are currently in an on state among the plurality of devices in the home, the processor 320 may request the user to choose.

For example, upon obtaining the first utterance saying, "Memorize the current channel as the TV channel," the processor 320 may detect "TV channel" as the first essential information and "current channel" as the second essential information. The processor 320 may identify that the first essential information includes the device name "TV" and the device state name "channel," obtain identification information (e.g., device ID information) about the TV device which is currently in an on state among the plurality of devices in the home and channel information (e.g., Channel 11) which is the current channel in the TV device as the device state information and store the same as the second essential information of the first information.

For example, upon obtaining the first utterance saying, "Memorize the current value as a living room air conditioner set temperature," the processor 320 may detect "living room air conditioner set temperature as the first essential information and "current value" as the second essential information. Upon identifying that the first essential information includes "living room air conditioner" which is the device name and "set temperature" which is the device state name, the processor 320 may obtain the identification information (e.g., device ID information) about the living room air conditioner which is currently in an on state among the plurality of devices in the home and the current set temperature (e.g., 20° C.) of the living room air conditioner which is currently in an on state, as the device state information, and store the same as the second essential information of the first information.

According to an embodiment, when there is disclosure target information of the first information, the processor 320 may set a sensitivity level corresponding to the disclosure target information included in the first information by referring to the sensitivity word DB stored in the memory 330 and store the set sensitivity level as the sensitivity information of the first information.

The processor 320 may identify the disclosure target information detected from the first utterance as the disclosure target information of the first information.

If the first utterance lacks a disclosure target, the processor 320 may identify disclosure target information generated based on at least one user corresponding to at least one device located in the same space as the electronic device or at least one device located in the home, as the disclosure target information of the first information.

For example, the processor 320 may set a sensitivity level (e.g., "high") corresponding to the disclosure target, i.e., "me," by referring to the sensitivity word DB, based on the disclosure target information, i.e., "so as to be known only to me," detected from the first utterance saying, "Memorize the entry door as 1234 so as to be known only to me as the password 0000," and store the set sensitivity level (e.g., "high") as the sensitivity information of the first information.

For example, although the first utterance saying "Memorize the entry door password as 1234" lacks disclosure target information, the processor 320 may detect the disclosure targets, e.g., son and mom, corresponding to at least one device currently detected in the home using the family member DB at the time of obtaining the first utterance. The processor 320 may set a sensitivity level (e.g., "medium") corresponding to the disclosure targets, e.g., son and mom, by referring to the sensitivity word DB and store the set sensitivity level (e.g., "medium") as the sensitivity information of the first information.

According to an embodiment, if there is no disclosure target information of the first information, the processor 320 may set a sensitivity level corresponding to a word included in the first essential information and second essential information included in the first utterance or a word corresponding to the first essential information, second essential information, and password information included in the first utterance by referring to the sensitivity word DB stored in the memory 330 and store the set sensitivity level as the sensitivity information of the first information.

According to an embodiment, the processor 320 may set the disclosure target information for the first information based on the sensitivity information of the first information.

For example, if the first information includes no disclosure target information, the processor 320 may analyze the first utterance saying "Memorize that the passport is in the TV cabinet so as to be known only to me" to thereby detect the disclosure target information "so as to be known only to me," set a sensitivity level (e.g., "high") corresponding to the disclosure target "me" by referring to the sensitivity word DB, and store the set sensitivity level as the sensitivity information of the first information. The processor 320 may set the disclosure target information of the first information as "me" based on the sensitivity information (e.g., "high") of the first information and, when "me" is determined to be "son" based on the family member DB and speech analysis on the first utterance, include "son" as disclosure target information in the first information.

For example, unless the first information includes disclosure target information, the processor 320 may analyze the first utterance saying "Memorize the Samsung bank account password as 9876" to thereby detect the words "account password" from the first essential information "Samsung bank account password," set a sensitivity level (e.g., "high") corresponding to the "account password" by referring to the sensitivity word DB, and store the set sensitivity level as sensitivity information of the first information. The processor 320 may set the disclosure target information of the first information as "me" based on the sensitivity information (e.g., "high") of the first information and, when "me" is determined to be "son" based on the family member DB and speech analysis on the first utterance, include "son" as disclosure target information in the first information.

According to an embodiment, the processor 320 may generate an authentication method by a combination of at least one piece of the user information, disclosure target information, or password information included in the first information.

The processor 320 may analyze the speech of the user who has issued the first utterance when the first utterance is input and, if the speech ID corresponding to the analyzed speech is present in the family member DB stored in the memory 330, include the speech ID as user information in the first information.

The processor 320 may generate a plurality of authentication methods by a combination of at least one piece of the user information, disclosure target information, or password information included in the first information and provide the plurality of authentication methods to be chosen by the user.

The processor 320 may generate a plurality of authentication methods by a combination of at least one piece of the user information, disclosure target information, or password information included in the first information and automatically set the authentication methods in order of the highest security to the lowest security among the plurality of authentication methods.

For example, the processor 320 may set at least one authentication method among authentication methods using the "speech ID information" based on the user information, authentication methods using "password information", authentication methods using the "speech ID information" and "when only me (son) is there" based on a combination of the user information and the disclosure target information, or authentication methods using the "speech ID information" and "when me (son) and mom are together" based on a combination of the user information and the disclosure target information.

According to an embodiment, upon storing the first information, the processor 320 may store first information including first essential information, second essential information, disclosure target information, sensitivity information, user information, authentication method, and save time information in a memory service DB of the memory 330.

According to an embodiment, the processor 320 may look up for at least one piece of first information stored in the memory service DB of the memory 330 at the request of at least one device (e.g., the smartphone 229) among the plurality of devices (e.g., the plurality of devices 221 to 229 of FIG. 2) in the home and may edit the first information at the request of the user of at least one device (e.g., the smartphone 229). The processor 320 may control to edit and look up only the first information including the user corresponding to the at least one device (e.g., the smartphone 229) as the disclosure target information.

According to an embodiment, the processor 320 may obtain a second utterance for looking up information related to a memory service and, upon obtaining the second utterance as a second utterance for looking up the first information stored in the memory service, complete authentication based on the authentication method included in the first information, determine a providing method determined based on the sensitivity information, and provide the essential information of the first information by the determined providing method.

According to an embodiment, the processor 320 may analyze the second utterance and, if the second utterance includes the first essential information of the first information, perform an authentication operation based on the authentication method included in the first information.

For example, upon identifying that "Samsung bank account password" is the first essential information of the first information from the second utterance saying, "Let me know the Samsung bank account password," the processor 320 may perform an authentication operation based on the authentication method included in the first information.

According to an embodiment, upon obtaining the second utterance, the processor 320 may identify an authentication method for the first information set among a plurality of authentication methods generated by a combination of at least one of the user information, disclosure target information, or password information included in the first information and perform an authentication method on the first information.

For example, the processor 320 may set at least one authentication method among authentication methods using the "speech ID information" or "password information" based on the user information, authentication methods using the "speech ID information" and "when only me (son) is there" based on a combination of the user information and the disclosure target information, or authentication methods using the "speech ID information" and "when me (son) and mom are together" based on a combination of the user information and the disclosure target information, as the authentication method for the first information.

For example, if the authentication method for the first information is set as "speech ID information," the processor 320 may analyze the speech of the user who has issued the second utterance and, when the speech ID corresponding to the analyzed speech matches the user information (e.g., speech id) of the first information stored in the memory service DB of the memory 330, identify authentication as complete.

For example, if the authentication method for the first information is set as "password information," the processor 320 may send a request for the password set in the first information to the user and, if the password information received through the user's speech matches the password information of the first information stored in the memory service DB of the memory 330, identify authentication as complete.

For example, if the authentication method for the first information is set as "speech ID information" and "when only me (son) is there," the processor 320 may analyze the speech of the user who has issued the second utterance and, if the speech ID corresponding to the analyzed speech matches the user information (e.g., the son's speech id) of the first information stored in the memory service DB of the memory 330, identify primary authentication as complete. Upon identifying that a device currently detected in the home at the time of obtaining the second utterance or a device connected via short-range communication in the same space (e.g., a room) as the first device through which the second utterance has been input among the plurality of devices in the home or the electronic device 301 through which the second utterance has been input at the time of obtaining the second utterance is the device of the "son," the processor 320 may identify final authentication as complete. If the device currently detected in the home or the device connected via short-range communication in the same space (e.g., a room) as the first device among the plurality of devices in the home or the electronic device 301 through which the second utterance has been input is a device (e.g., a device of a family member) other than the device of the "son," the processor 320 may identify an authentication failure.

For example, if the authentication method for the first information is set as "speech ID information" and "when me (son) and mom are together," the processor 320 may analyze the speech of the user who has issued the second utterance and, if the speech ID corresponding to the analyzed speech matches the user information (e.g., the son's speech ID or the mom's speech id) of the first information stored in the memory service DB of the memory 330, identify primary authentication as complete. Upon identifying that at least one device detected in the home at the time of obtaining the second utterance or at least one device connected via short-range communication in the same space (e.g., a room) as the first device through which the second utterance has been input among the plurality of devices in the home or the electronic device 301 through which the second utterance has been input at the time of obtaining the second utterance is the device of the "son" and the device of the "mom," the processor 320 may identify final authentication as complete. If the device currently detected in the home or the device connected via short-range communication in the same space (e.g., a room) as the first device among the plurality of devices in the home or the electronic device 301 through which the second utterance has been input includes only the device of the "son," the processor 320 may identify an authentication failure. If at least one device currently detected in the home or at least one device connected via short-range communication in the same space (e.g., a room) as the first device among the plurality of devices in the home or the electronic device 301 through which the second utterance has been input includes a device (e.g., a device of a family member) other than the device of the "son" and the device of the "mom," the processor 320 may identify an authentication failure.

According to an embodiment, when authentication is complete by the authentication method for the first information, the processor 320 may determine a providing method for the first information based on the sensitivity information of the first information and provide the essential information of the first information by the determined providing method.

For example, the processor 320 may determine one of providing methods via a display, providing methods via a display, providing methods via message transmission, providing methods via a speaker, or providing methods via a speaker and/or a display, depending on the sensitivity level (e.g., high, medium, or low) included in the sensitivity information.

For example, when the sensitivity information of the first information is "high," the processor 320 may provide the first information via a display without outputting a speech.

For example, when the sensitivity information of the first information is "high" and the first information may not be provided via a display, the processor 320 may transmit the first information to the user's device as a message.

According to an embodiment, when the second utterance is an utterance requesting first information including time information, the processor 320 may provide the first information based on the save time information included in the first information.

For example, upon obtaining the second utterance saying "Let me know the TV channel I have watched last night" on Tuesday, the processor 320 may detect the first information storing TV channel information (e.g., channel 11) for a night time of the previous day (e.g., 9 PM on Monday) from the memory service DB of the memory 330 and provide the detected first information.

According to an embodiment, upon providing the first information according to obtaining the second utterance, the processor 320 may provide the first information by the optimal method depending on the type of the device which has obtained the second utterance. The processor 320 may modify or limit the operation of providing the first information by the optimal method depending on the type of the device which has obtained the second utterance, according to the sensitivity information of the first information.

For example, if the second utterance is input to an artificial intelligence (AI) speaker (e.g., the AI speaker 225) among the plurality of devices (e.g., the plurality of devices 221 to 229 of FIG. 2) in the home, the processor 320 may provide the first information in a speech through the AI speaker.

For example, if the second utterance is input to an earbud (not shown) worn on the user among the plurality of devices (e.g., the plurality of devices 221 to 229 of FIG. 2) in the home, the processor 320 may provide the first information in a speech through the earbud.

For example, if the second utterance is input to a TV device (e.g., the TV device 222 of FIG. 2) among the plurality of devices (e.g., the plurality of devices 221 to 229 of FIG. 2) in the home, the processor 320 may provide the first information through the display of the TV device.

According to an embodiment, upon identifying that the second utterance is an utterance requesting to execute the first information, the processor 320 may detect the device identification information and device state information stored as the second essential information of the first information and control the device corresponding to the device identification information to execute the function corresponding to the device state information.

For example, upon obtaining the second utterance saying "Play the TV channel I've watched last night," the processor 320 may detect the first information storing the TV channel information (e.g., channel 11) for the night time (e.g., 9 PM on Monday) for the previous day from the memory service DB of the memory 330, turn on the "room TV" corresponding to the device identification information stored as the second essential information of the first information and run the "channel 11" corresponding to the device state information stored as the second essential information.

According to an embodiment, the memory 330 may store the device information gathered by and received from the plurality of devices (e.g., the plurality of devices 221 to 229 of FIG. 2) in the home, which are managed by the electronic device 301 (e.g., the electronic device 201 of FIG. 2).

According to an embodiment, the memory 330 may store a family member DB as shown in Table 1 below.

TABLE 1

| Device id | Account | Family member | Speech id |
|---|---|---|---|
| smartphone 1 | user1 | Dad | a1 |
| smartphone 2 | user2 | Mom | a2 |
| smartphone 3 | user3 | Son | a3 |
| watch phone 1 | user3 | Son | a3 |

According to an embodiment, the memory 330 may store a memory service DB as shown in Table 2 below.

TABLE 2

| First information Type | First essential information Information | Authentication method | Second essential information Information | Disclosure target | Sensitivity information | Save time | User Information (speech id) |
|---|---|---|---|---|---|---|---|
| first information (A1) | Samsung Bank account password | speech ID and when me (son) is there | 987 | Son | high | November 23 1:00 pm | a1 |
| first information (A2) | TV channel | Speech id | Channel 11 | (family) all | low | November 23 9:00 pm | a1, a2, and a3 |
| ... | ... | ... | ... | ... | ... | ... | ... |

According to an embodiment, the memory 330 may store the providing method for the first information corresponding to the sensitivity level included in the sensitivity information. According to an embodiment, the display 360 may display the function being currently performed by the electronic device 301 under the control of the processor 320.

According to an embodiment, the display 360 may display the first information stored in the memory service DB.

According to an embodiment, the communication module 390 may include a plurality of communication circuits using different communication technologies.

According to an embodiment, the communication module 390 may include a mobile communication module (not shown) or a sub communication module (not shown) performing short-range communication with a wireless LAN. The communication module 390 may perform communication with an external device using at least one antenna (not shown) under the control of the processor 320.

According to an embodiment, the communication module 390 may include at least one of a wireless LAN module (not shown) and a short-range communication module (not shown) and may include a near-field communication (NFC) communication module, Bluetooth legacy communication module, Bluetooth low energy (BLE) communication module, and/or ultra-wideband (UWB) communication module as the short-range communication module.

According to an embodiment, an electronic device (e.g., the electronic device 101 of FIG. 1, the electronic device 201 of FIG. 2, the electronic device 301 of FIG. 3, the electronic device 1101 of FIGS. 11A and 11B, or the electronic device 1201 of FIGS. 12A to 12C) comprises a communication module (e.g., the communication module 190 of FIG. 1 or the communication module 390 of FIG. 3), a memory (e.g., the memory 130 of FIG. 1 or the memory 330 of FIG. 3), and a processor (e.g., the processor 120 of FIG. 1 or the processor 320 of FIG. 3) configured to, upon obtaining a first utterance related to a memory service, prepare to store first information for the memory service for the first utterance and store the first information including essential information, sensitivity information for the first information, and an authentication method for the first information, detected from the first utterance, in the memory, and obtain a second utterance for looking up information related to the memory service, upon identifying that the obtained second utterance is one for looking up the first information, complete authentication based on the authentication method, and provide the essential information by a providing method determined based on the sensitivity information.

According to an embodiment, the processor may be configured to further include, in the first information, disclosure target information of the first information, user information for identifying a user entering the first utterance, time information indicating a time of saving the first information, and/or password information that may be included in the first utterance.

According to an embodiment, the processor may be configured to detect first essential information indicating a target to be memorized in the first utterance and second essential information indicating a state value of the target, as the essential information.

According to an embodiment, the processor may be configured to, when first essential information indicating a target to be memorized in the first utterance includes a device name and a device state name, obtain identification information for a device corresponding to the device name among a plurality of devices in a home and state information for a device corresponding to the device state name, and store the device identification information and the device state information as second essential information indicating a state value of the target to be memorized, of the essential information.

According to an embodiment, the processor may be configured to, when the first utterance includes disclosure target information, detect the disclosure target information from the first utterance and include the detected disclosure target information in the first information and, when the first utterance does not include the disclosure target information, generate at least one piece of user information corresponding to at least one device located in the same space as the electronic device or at least one device located in the home, as disclosure target information, and include the generated disclosure target information in the first information.

According to an embodiment, the processor may be configured to when the first information includes disclosure target information, set a sensitivity level corresponding to the disclosure target information by referring to a sensitivity word database (DB) stored in the memory and store the set sensitivity level as the sensitivity information of the first information, and when the first information does not include the disclosure target information, set a sensitivity level corresponding to at least one word included in the first utterance by referring to the sensitivity word DB stored in the memory and store the set sensitivity level as the sensitivity information of the first information.

According to an embodiment, the processor may be configured to generate an authentication method by a combination of at least one piece of user information, disclosure target information, or password information included in the first information.

According to an embodiment, the processor may be configured to, upon identifying that the second utterance is an utterance requesting to execute the first information, control a first device among a plurality of devices in a home to execute the first information.

According to an embodiment, the processor may be configured to, upon receiving the first utterance from a first device among a plurality of devices in a home, store the first information in the memory and notify the first device that the storage of the first information is complete.

According to an embodiment, the processor may be configured to, upon receiving the second utterance from a first device among a plurality of devices in a home, detect the first information from the memory and transmit the first information to the first device.

Figure 4:
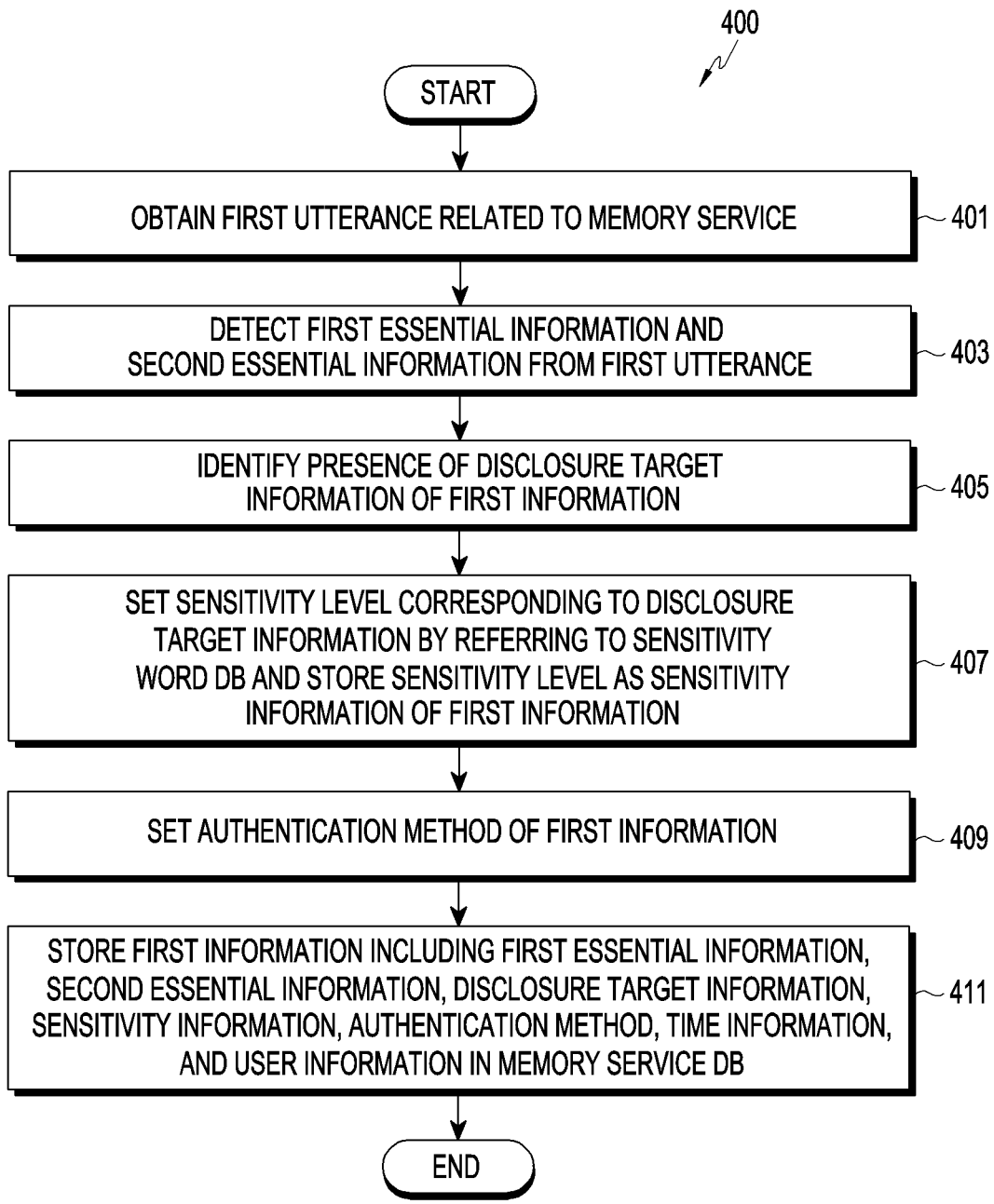
FIG. 4 illustrates a flowchart of an operation of storing first information for a memory service by an electronic device according to an embodiment of this disclosure.

FIG. 4 illustrates a flowchart 400 of an operation of storing first information for a memory service by an electronic device according to an embodiment of this disclosure. The storing operation may include operations 401 to 411. According to an embodiment, at least one of operations 401 to 411 may be omitted or changed in order or may add other operations.

In operation 401, an electronic device (e.g., the electronic device 101 of FIG. 1, the electronic device 201 of FIG. 2, or the electronic device 301 of FIG. 3) may obtain a first utterance related to a memory service.

According to an embodiment, the electronic device may obtain the first utterance directly input by the user or may obtain the first utterance directly input by the user from a first device capable of a speech service among the plurality of devices (e.g., the plurality of devices 221 to 229 of FIG. 2) in the home.

According to an embodiment, upon detecting, e.g., "Memorize" or "Save" as a preset phrase to request a memory service from the utterance by analysis of the utterance, the electronic device may determine that the utterance is the first utterance related to the memory service.

According to an embodiment, the electronic device may prepare to store the first information for the memory service for the first utterance.

In operation 403, the electronic device (e.g., the electronic device 101 of FIG. 1, the electronic device 201 of FIG. 2, or the electronic device 301 of FIG. 3) may detect first essential information and second essential information from the first utterance.

According to an embodiment, the electronic device may detect first essential information indicating the target to be memorized in the first utterance and second essential information indicating a state value of the target to be memorized, as the essential information, by analyzing the first utterance.

In operation 405, the electronic device (e.g., the electronic device 101 of FIG. 1, the electronic device 201 of FIG. 2, or the electronic device 301 of FIG. 3) may identify that the first information includes disclosure target information.

According to an embodiment, the electronic device may detect disclosure target information for the first information and password information for the first information, as non-essential information, by analyzing the first utterance. Upon detecting the disclosure target information for the first information from the first utterance, the electronic device may analyze the speech of the user who has issued the first utterance when the first utterance is input. When a speech ID corresponding to the analyzed speech is present in a family member DB stored in a memory (e.g., the memory 330 of FIG. 2), the electronic device may detect the user corresponding to the speech ID and identify the detected user as the disclosure target for the first information.

According to an embodiment, if the first utterance does not include the disclosure target information, the electronic device may generate at least one user corresponding to at least one device connected with the electronic device via a network among the plurality of devices currently in the home, as disclosure target information, and identify the generated disclosure target information as the disclosure target information for the first information.

According to an embodiment, if the first utterance does not include the disclosure target information, the electronic device may generate at least one user corresponding to at least one device capable of performing short-range communication (e.g., BT communication or UWB communication) with the first device among the plurality of devices in the home or the electronic device through which the first utterance has been input directly, as disclosure target information, and identify the generated disclosure target information as the disclosure target information of the first information.

In operation 407, the electronic device (e.g., the electronic device 101 of FIG. 1, the electronic device 201 of FIG. 2, or the electronic device 301 of FIG. 3) may set a sensitivity level corresponding to the disclosure target information by referring to the sensitivity word DB and store the sensitivity level as the sensitivity information of the first information.

According to an embodiment, the electronic device may set a sensitivity level corresponding to the disclosure target information included in the first information by referring to the sensitivity word DB stored in a memory (e.g., the memory 330 of FIG. 2) and store the set sensitivity level as the sensitivity information of the first information.

In operation 409, the electronic device (e.g., the electronic device 101 of FIG. 1, the electronic device 201 of FIG. 2, or the electronic device 301 of FIG. 3) may set an authentication method for the first information.

According to an embodiment, the electronic device may generate an authentication method by a combination of at least one piece of the user information, disclosure target information, or password information included in the first information.

According to an embodiment, the electronic device may generate a plurality of authentication methods by a combination of at least one piece of the user information, disclosure target information, or password information included in the first information and provide the plurality of authentication methods to be chosen by the user.

According to an embodiment, the electronic device may generate a plurality of authentication methods by a combination of at least one piece of the user information, disclosure target information, or password information included in the first information and automatically set the authentication methods in order of the highest security to the lowest security among the plurality of authentication methods.

In operation 411, the electronic device (e.g., the electronic device 101 of FIG. 1, the electronic device 201 of FIG. 2, or the electronic device 301 of FIG. 3) may store the first information including the first essential information, the second essential information, the disclosure target information, the sensitivity information, the authentication method, the time information, and the user information in the memory service DB.

According to an embodiment, the electronic device may analyze the speech of the user who has issued the first utterance when the first utterance is input and, if the speech ID corresponding to the analyzed speech is present in the family member DB stored in the memory (e.g., the memory 330 of FIG. 2), include the speech ID as user information in the first information.

Figure 5:
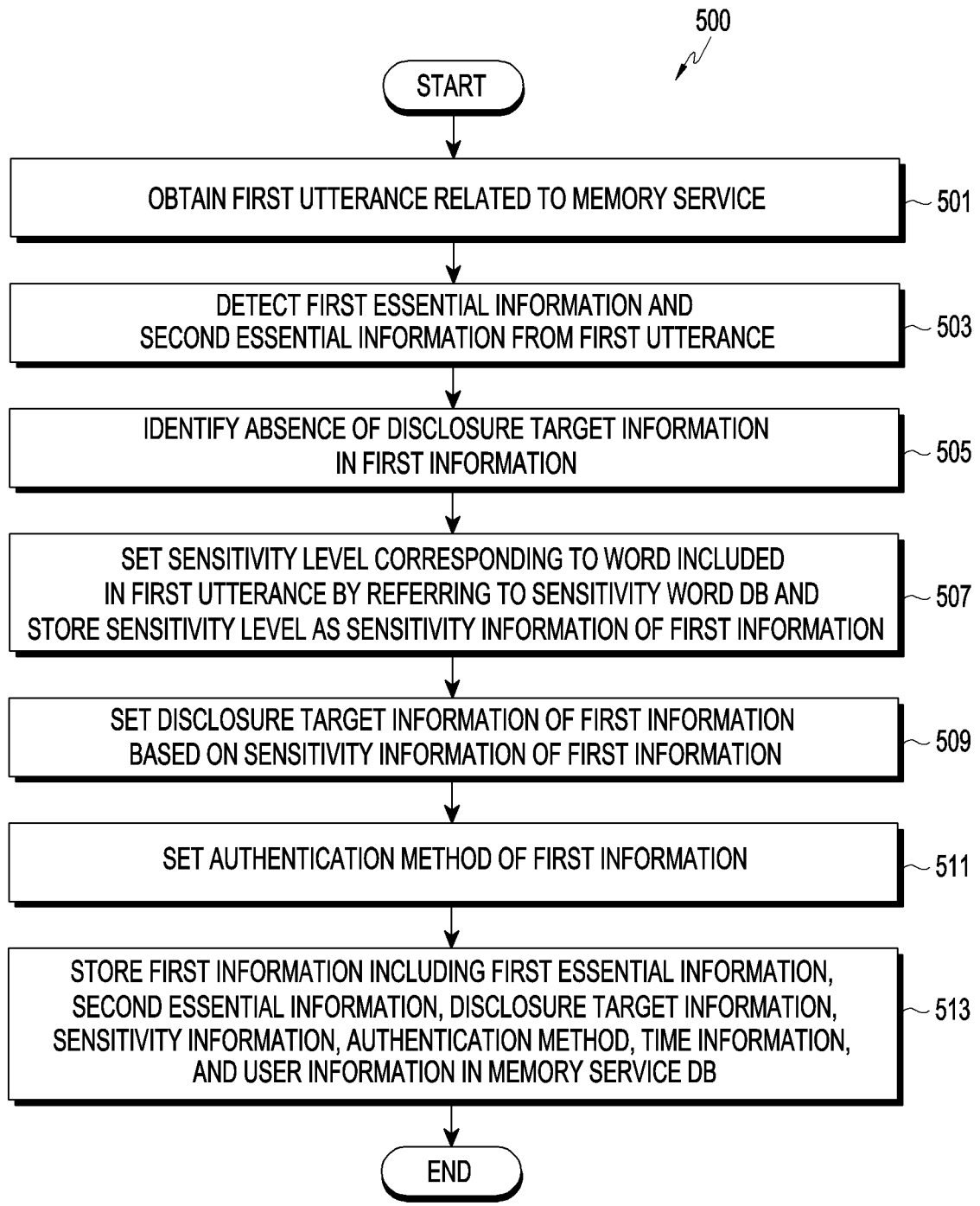
FIG. 5 illustrates a flowchart of an operation of storing first information for a memory service by an electronic device according to an embodiment of this disclosure.

FIG. 5 illustrates a flowchart 500 of an operation of storing first information for a memory service by an electronic device according to an embodiment of this disclosure. The storing operation may include operations 501 to 513. According to an embodiment, at least one of operations 501 to 513 may be omitted or changed in order or may add other operations.

In operation 501, an electronic device (e.g., the electronic device 101 of FIG. 1, the electronic device 201 of FIG. 2, or the electronic device 301 of FIG. 3) may obtain a first utterance related to a memory service.

According to an embodiment, the electronic device may obtain the first utterance directly input by the user or may obtain the first utterance directly input by the user from a first device capable of a speech service among the plurality of devices (e.g., the plurality of devices 221 to 229 of FIG. 2) in the home to the first device.

According to an embodiment, upon detecting, e.g., "Memorize" or "Save" as a preset phrase to request a memory service from the utterance by analysis of the utterance, the electronic device may determine that the utterance is the first utterance related to the memory service.

According to an embodiment, the electronic device may prepare to store the first information for the memory service for the first utterance.

In operation 503, the electronic device (e.g., the electronic device 101 of FIG. 1, the electronic device 201 of FIG. 2, or the electronic device 301 of FIG. 3) may detect first essential information and second essential information from the first utterance.

According to an embodiment, the electronic device may detect first essential information indicating the target to be memorized in the first utterance and second essential information indicating a state value of the target to be memorized, as the essential information, by analyzing the first utterance.

In operation 505, the electronic device (e.g., the electronic device 101 of FIG. 1, the electronic device 201 of FIG. 2, or the electronic device 301 of FIG. 3) may identify that the first information does not include disclosure target information.

In operation 507, the electronic device (e.g., the electronic device 101 of FIG. 1, the electronic device 201 of FIG. 2, or the electronic device 301 of FIG. 3) may set a sensitivity level corresponding to a word included in the first utterance by referring to the sensitivity word DB and store the sensitivity level as the sensitivity information of the first information.

According to an embodiment, the electronic device may set a sensitivity level corresponding to a word included in the first essential information and second essential information included in the first utterance or a word corresponding to the first essential information, second essential information, and password information included in the first utterance by referring to the sensitivity word DB stored in the memory (e.g., the memory 330 of FIG. 2) and store the set sensitivity level as the sensitivity information of the first information.

In operation 509, the electronic device (e.g., the electronic device 101 of FIG. 1, the electronic device 201 of FIG. 2, or the electronic device 301 of FIG. 3) may set disclosure target information for the first information based on the sensitivity information of the first information.

According to an embodiment, the electronic device may set disclosure target information (e.g., "me (son)," "son and mom," and "all") for the first information depending on the type of the sensitivity level (e.g., "high," "medium," or "low") included in the sensitivity information and include the set two-dimension image in the first information.

In operation 511, the electronic device (e.g., the electronic device 101 of FIG. 1, the electronic device 201 of FIG. 2, or the electronic device 301 of FIG. 3) may set an authentication method for the first information.

According to an embodiment, the electronic device may generate an authentication method by a combination of at least one piece of the user information, disclosure target information, or password information included in the first information.

According to an embodiment, the electronic device may generate a plurality of authentication methods by a combination of at least one piece of the user information, disclosure target information, or password information included in the first information and provide the plurality of authentication methods to be chosen by the user.

According to an embodiment, the electronic device may generate a plurality of authentication methods by a combination of at least one piece of the user information, disclosure target information, or password information included in the first information and automatically set the authentication methods in order of the highest security to the lowest security among the plurality of authentication methods.

In operation 513, the electronic device (e.g., the electronic device 101 of FIG. 1, the electronic device 201 of FIG. 2, or the electronic device 301 of FIG. 3) may store the first information including the first essential information, the second essential information, the disclosure target information, the sensitivity information, the authentication method, the time information, and the user information in the memory service DB.

According to an embodiment, the electronic device may analyze the speech of the user who has issued the first utterance when the first utterance is input and, if the speech ID corresponding to the analyzed speech is present in the family member DB stored in the memory (e.g., the memory 330 of FIG. 2), include the speech ID as user information in the first information.

Figure 6:
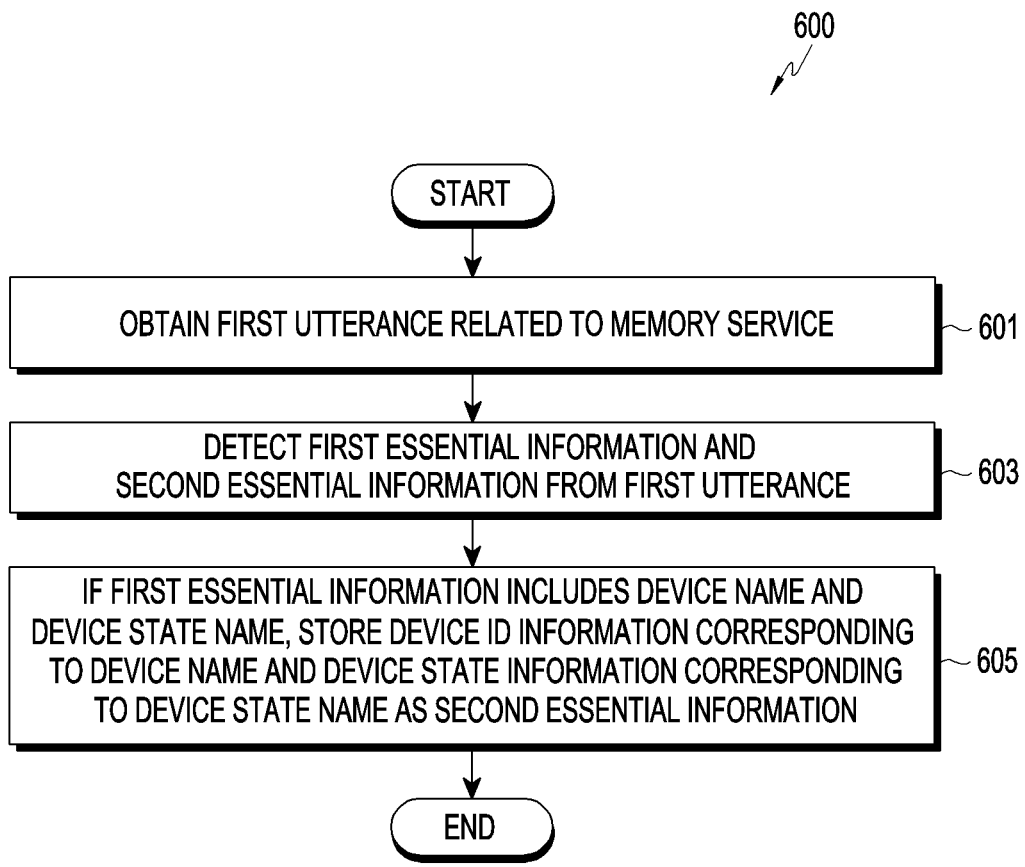
FIG. 6 illustrates a flowchart of an operation of setting second essential information of first information for a memory service by an electronic device according to an embodiment of this disclosure.

FIG. 6 illustrates a flowchart 600 of an operation of setting second essential information of first information for a memory service by an electronic device according to an embodiment of this disclosure. The operation of setting the second essential information may include operations 601 to 605. According to an embodiment, at least one of operations 601 to 605 may be omitted or changed in order or may add other operations.

In operation 601, an electronic device (e.g., the electronic device 101 of FIG. 1, the electronic device 201 of FIG. 2, or the electronic device 301 of FIG. 3) may obtain a first utterance related to a memory service.

According to an embodiment, the electronic device may obtain the first utterance directly input by the user or may obtain the first utterance directly input by the user from a first device capable of a speech service among the plurality of devices (e.g., the plurality of devices 221 to 229 of FIG. 2) in the home to the first device.

According to an embodiment, upon detecting, e.g., "Memorize" or "Save" as a preset phrase to request a memory service from the utterance by analysis of the utterance, the electronic device may determine that the utterance is the first utterance related to the memory service.

According to an embodiment, the electronic device may prepare to store the first information for the memory service for the first utterance.

In operation 603, the electronic device (e.g., the electronic device 101 of FIG. 1, the electronic device 201 of FIG. 2, or the electronic device 301 of FIG. 3) may detect first essential information and second essential information from the first utterance.

According to an embodiment, the electronic device may detect first essential information indicating the target to be memorized in the first utterance and second essential information indicating a state value of the target to be memorized, as the essential information, by analyzing the first utterance.

In operation 605, if the first essential information includes a device name and a device state name, the electronic device (e.g., the electronic device 101 of FIG. 1, the electronic device 201 of FIG. 2, or the electronic device 301 of FIG. 3) may store device ID information corresponding to the device name and device state information corresponding to the device state name as the second essential information.

According to an embodiment, when the first essential information detected from the first utterance includes a device name and a device state name, the electronic device may obtain identification information (e.g., device ID information about a TV device) about the device (e.g., the TV device) corresponding to the device name included in the first essential information among the plurality of devices (e.g., the plurality of devices 221 to 229 of FIG. 2) in the home and state information (e.g., channel 11) about the device corresponding to the device state name (e.g., channel) included in the first essential information and store the obtained device identification information and the device state information as the second essential information of the first information.

According to an embodiment, the electronic device may detect at least one device corresponding to the device name included in the first essential information among the plurality of devices in the home and detect the device (e.g., a room TV device) which is currently in an on state among the at least one detected device as the device corresponding to the device name included in the first essential information.

Figure 7:
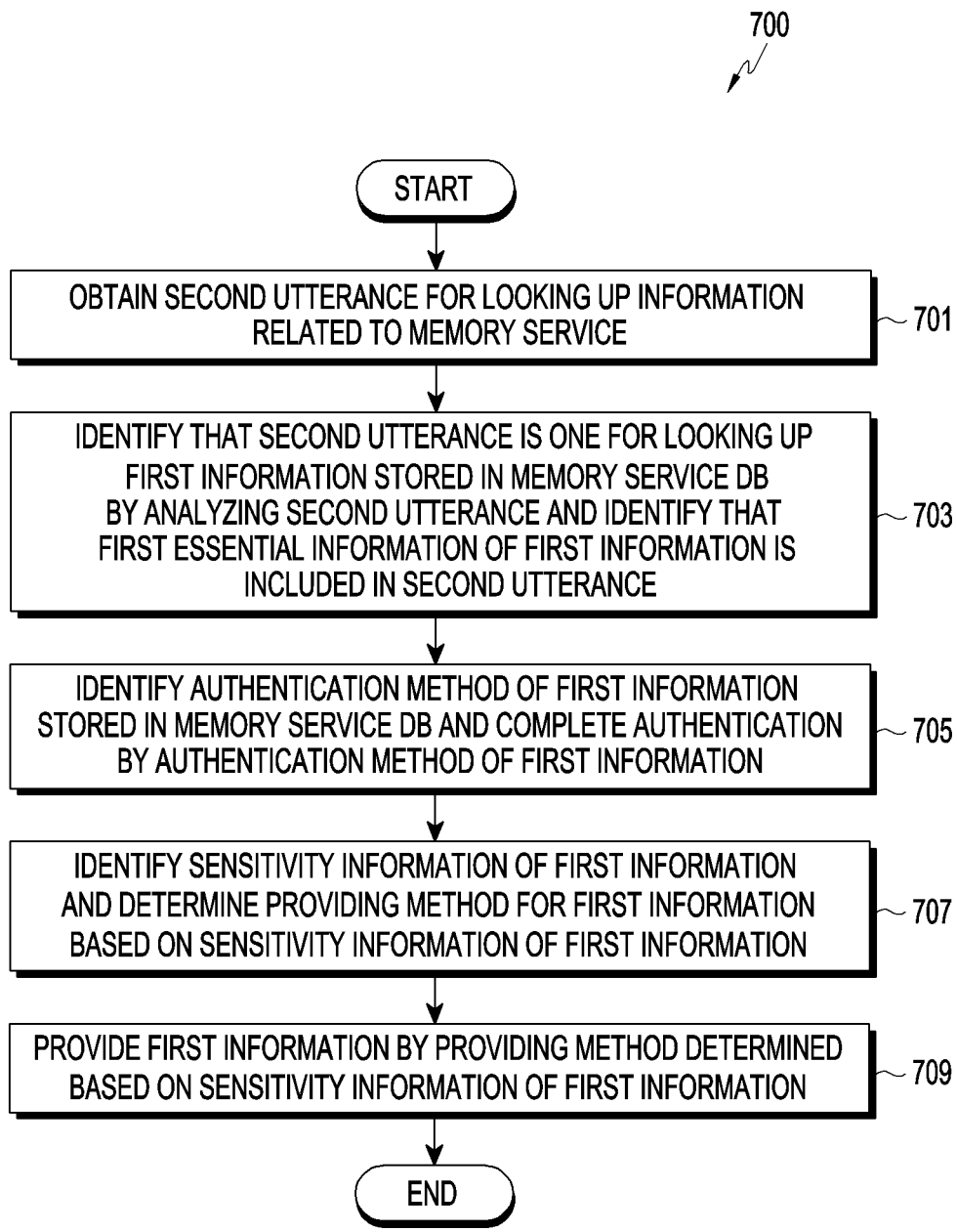
FIG. 7 illustrates a flowchart of an operation of looking up first information for a memory service by an electronic device according to an embodiment of this disclosure.

FIG. 7 illustrates a flowchart 700 of an operation of looking up first information for a memory service by an electronic device according to an embodiment of this disclosure. The look-up operation may include operations 701 to 709. According to an embodiment, at least one of operations 701 to 709 may be omitted or changed in order or may add other operations.

In operation 701, an electronic device (e.g., the electronic device 101 of FIG. 1, the electronic device 201 of FIG. 2, or the electronic device 301 of FIG. 3) may obtain a second utterance for looking up information related to a memory service.

According to an embodiment, the electronic device may analyze the utterance and, upon detecting a phrase, such as "in the memory service" and/or "let me know" from the analyzed utterance, determine that the utterance is a second utterance for looking up the information related to the memory service.

In operation 703, the electronic device (e.g., the electronic device 101 of FIG. 1, the electronic device 201 of FIG. 2, or the electronic device 301 of FIG. 3) may analyze the second utterance, identify that the second utterance is a second utterance for looking up the first information stored in the memory service DB, and identify that the first essential information of the first information is included in the second utterance.

In operation 705, the electronic device (e.g., the electronic device 101 of FIG. 1, the electronic device 201 of FIG. 2, or the electronic device 301 of FIG. 3) may identify the authentication method of the first information stored in the memory service DB and complete authentication by the authentication method of the first information.

According to an embodiment, the electronic device may identify an authentication method for the first information set among a plurality of authentication methods generated by a combination of at least one piece of the user information, disclosure target information, or password information included in the first information and perform an authentication method on the first information.

For example, the electronic device may set at least one authentication method among authentication methods using the speech ID information or password information based on the user information, authentication methods using the speech ID information and when only me (son) is there based on a combination of the user information and the disclosure target information, or authentication methods using the speech ID information and when me (son) and mom are together based on a combination of the user information and the disclosure target information, as the authentication method for the first information.

In operation 707, the electronic device (e.g., the electronic device 101 of FIG. 1, the electronic device 201 of FIG. 2, or the electronic device 301 of FIG. 3) may identify the sensitivity information of the first information and determine a providing method for the first information based on the sensitivity information of the first information.

According to an embodiment, if authentication is completed by the authentication method of the first information, the electronic device may determine a providing method for the first information based on the sensitivity information of the first information.

For example, if the sensitivity level included in the sensitivity information is "high," the electronic device may determine that the providing method for the first information is a providing method via a display and/or a providing method via message transmission. When the sensitivity level included in the sensitivity information is "medium," the electronic device may determine that the providing method for the first information is a providing method via a speaker. When the sensitivity level included in the sensitivity information is "low," the electronic device may determine that the providing method for the first information is a providing method via a speaker.

In operation 709, the electronic device (e.g., the electronic device 101 of FIG. 1, the electronic device 201 of FIG. 2, or the electronic device 301 of FIG. 3) may provide the first information by the providing method determined based on the sensitivity information of the first information.

Figure 8:
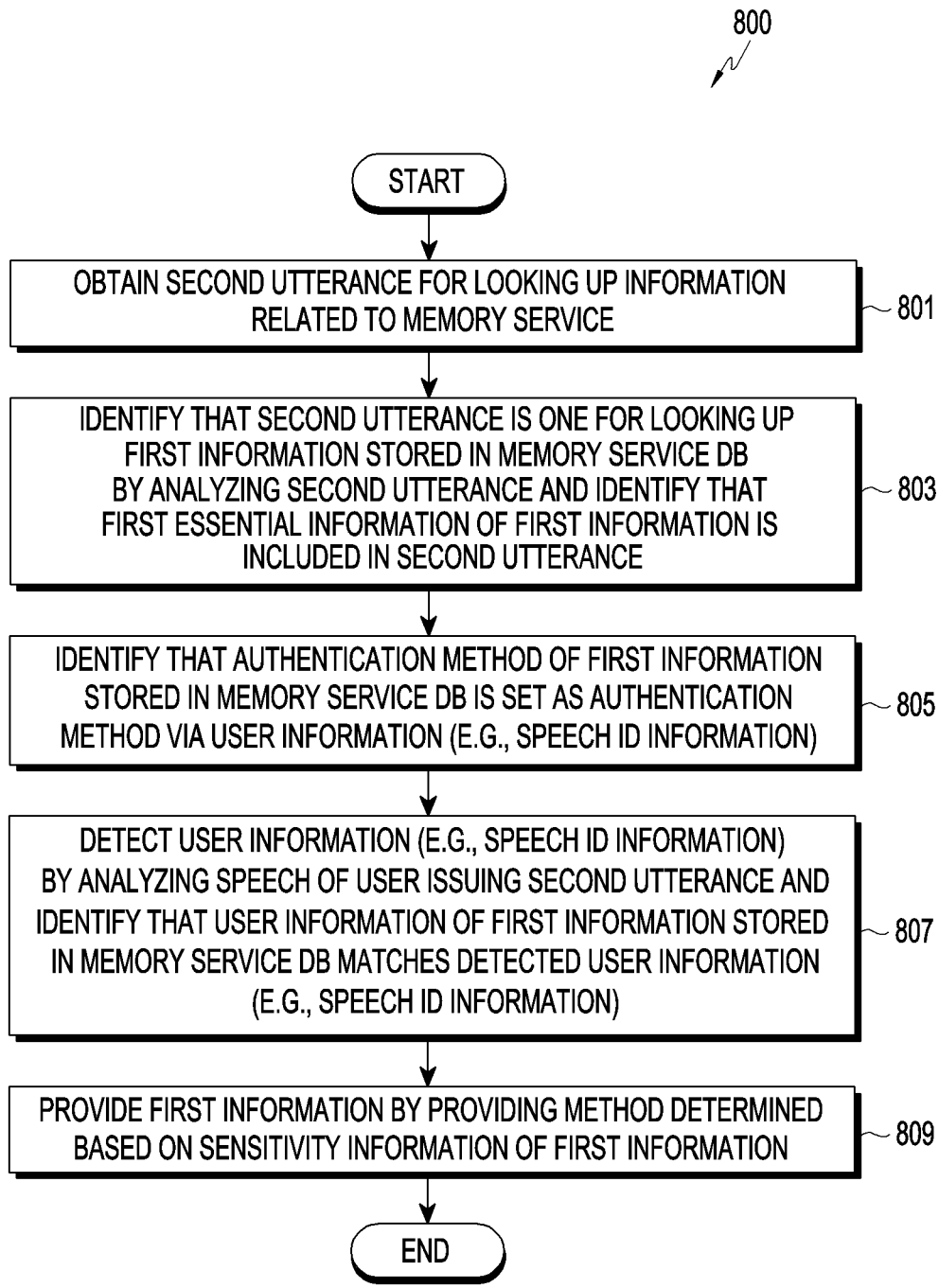
FIG. 8 illustrates a flowchart of a method for authenticating first information for a memory service by an electronic device according to an embodiment of this disclosure.

FIG. 8 illustrates a flowchart 800 of a method for authenticating first information for a memory service by an electronic device according to an embodiment of this disclosure. The authentication method may include operations 801 to 809. According to an embodiment, at least one of operations 801 to 809 may be omitted or changed in order or may add other operations.

In operation 801, an electronic device (e.g., the electronic device 101 of FIG. 1, the electronic device 201 of FIG. 2, or the electronic device 301 of FIG. 3) may obtain a second utterance for looking up information related to a memory service.

According to an embodiment, the electronic device may analyze the utterance and, upon detecting a phrase, such as "in the memory service" and/or "let me know" from the analyzed utterance, determine that the utterance is a second utterance for looking up the information related to the memory service.

In operation 803, the electronic device (e.g., the electronic device 101 of FIG. 1, the electronic device 201 of FIG. 2, or the electronic device 301 of FIG. 3) may analyze the second utterance. The electronic device may also identify that the second utterance is a second utterance for looking up the first information stored in the memory service DB. The electronic device may further identify that the first essential information of the first information is included in the second utterance.

In operation 805, the electronic device (e.g., the electronic device 101 of FIG. 1, the electronic device 201 of FIG. 2, or the electronic device 301 of FIG. 3) may identify that the authentication method for the first information stored in the memory service DB is set as an authentication method for user information (e.g., speech ID information).

In operation 807, the electronic device (e.g., the electronic device 101 of FIG. 1, the electronic device 201 of FIG. 2, or the electronic device 301 of FIG. 3) may analyze the speech of the user who has issued the second utterance. The electronic device may also detect the user information (e.g., speech ID information) and identify that the user information of the first information stored in the memory service DB matches the detected user information (e.g., speech ID information).

According to an embodiment, the electronic device may analyze the speech of the user who has issued the second utterance and, if the speech ID corresponding to the analyzed speech matches the user information (e.g., speech id) of the first information stored in the memory service DB of the memory (e.g., the memory 330 of FIG. 2), identify that authentication is complete.

In operation 809, the electronic device (e.g., the electronic device 101 of FIG. 1, the electronic device 201 of FIG. 2, or the electronic device 301 of FIG. 3) may provide the first information by the providing method determined based on the sensitivity information of the first information.

Figure 9:
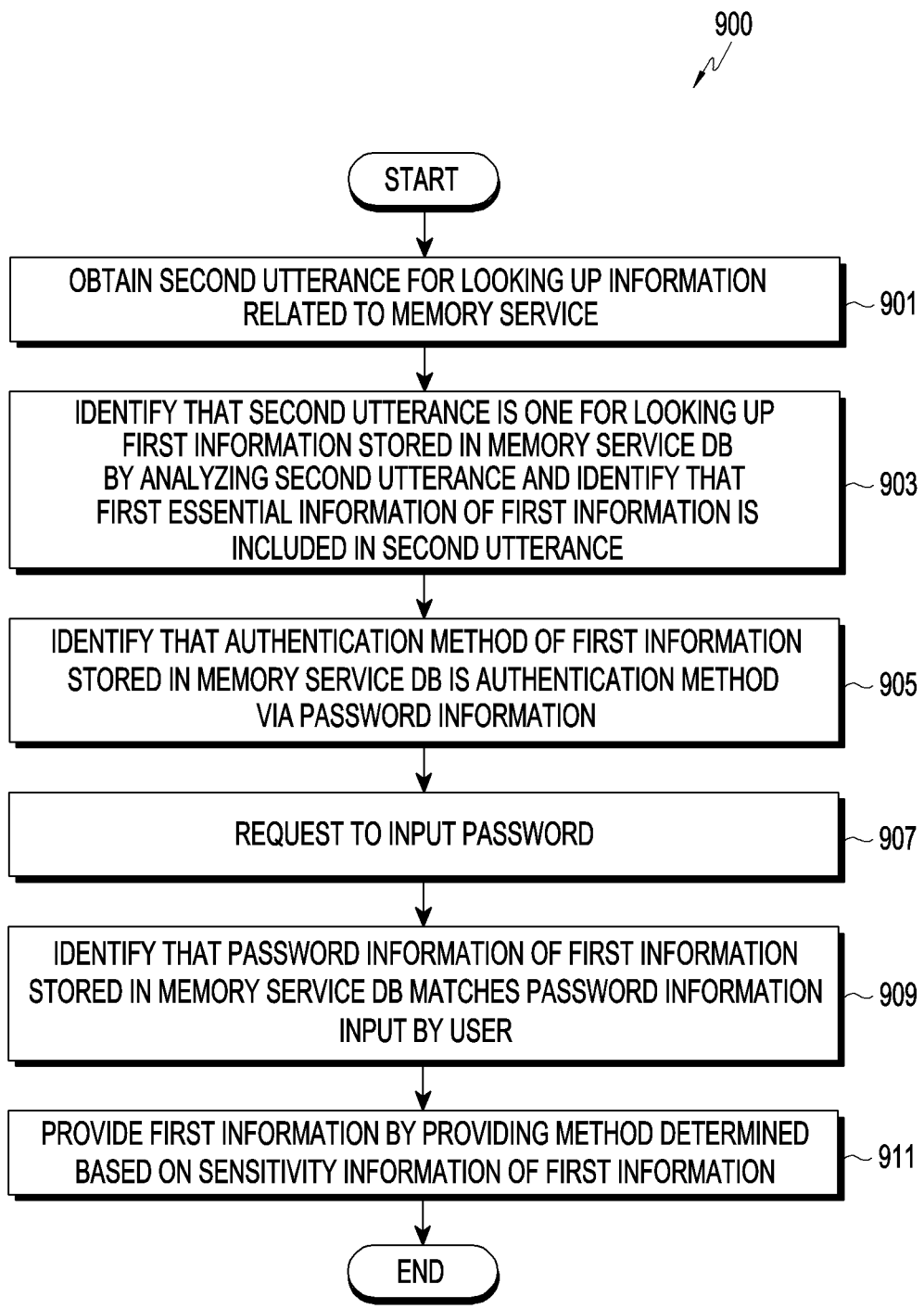
FIG. 9 illustrates a flowchart of the operation of authenticating first information for a memory service by an electronic device according to an embodiment of this disclosure.

FIG. 9 illustrates a flowchart 900 of an operation of authenticating first information for a memory service by an electronic device according to an embodiment of this disclosure. The authentication method may include operations 901 to 911. According to an embodiment, at least one of operations 901 to 911 may be omitted or changed in order or may add other operations.

In operation 901, an electronic device (e.g., the electronic device 101 of FIG. 1, the electronic device 201 of FIG. 2, or the electronic device 301 of FIG. 3) may obtain a second utterance for looking up information related to a memory service.

According to an embodiment, the electronic device may analyze the utterance and, upon detecting a phrase, such as "in the memory service" and/or "let me know" from the analyzed utterance, determine that the utterance is a second utterance for looking up the information related to the memory service.

In operation 903, the electronic device (e.g., the electronic device 101 of FIG. 1, the electronic device 201 of FIG. 2, or the electronic device 301 of FIG. 3) may analyze the second utterance. The electronic device may also identify that the second utterance is a second utterance for looking up the first information stored in the memory service DB and identify that the first essential information of the first information is included in the second utterance.

In operation 905, the electronic device (e.g., the electronic device 101 of FIG. 1, the electronic device 201 of FIG. 2, or the electronic device 301 of FIG. 3) may identify that the authentication method for the first information stored in the memory service DB is set as an authentication method for password information.

In operation 907, the electronic device (e.g., the electronic device 101 of FIG. 1, the electronic device 201 of FIG. 2, or the electronic device 301 of FIG. 3) may request the user to input the password set in the first information.

According to an embodiment, the electronic device may request the user to input the password set in the first information via a speech or message.

In operation 909, the electronic device (e.g., the electronic device 101 of FIG. 1, the electronic device 201 of FIG. 2, or the electronic device 301 of FIG. 3) may identify that the password information of the first information stored in the memory service DB matches the password information input by the user.

According to an embodiment, if the password information received via the user's speech matches the password information of the first information stored in the memory service DB of the memory (e.g., the memory 330 of FIG. 2), identify that authentication is complete.

In operation 911, the electronic device (e.g., the electronic device 101 of FIG. 1, the electronic device 201 of FIG. 2, or the electronic device 301 of FIG. 3) may provide the first information by the providing method determined based on the sensitivity information of the first information.

Figure 10:
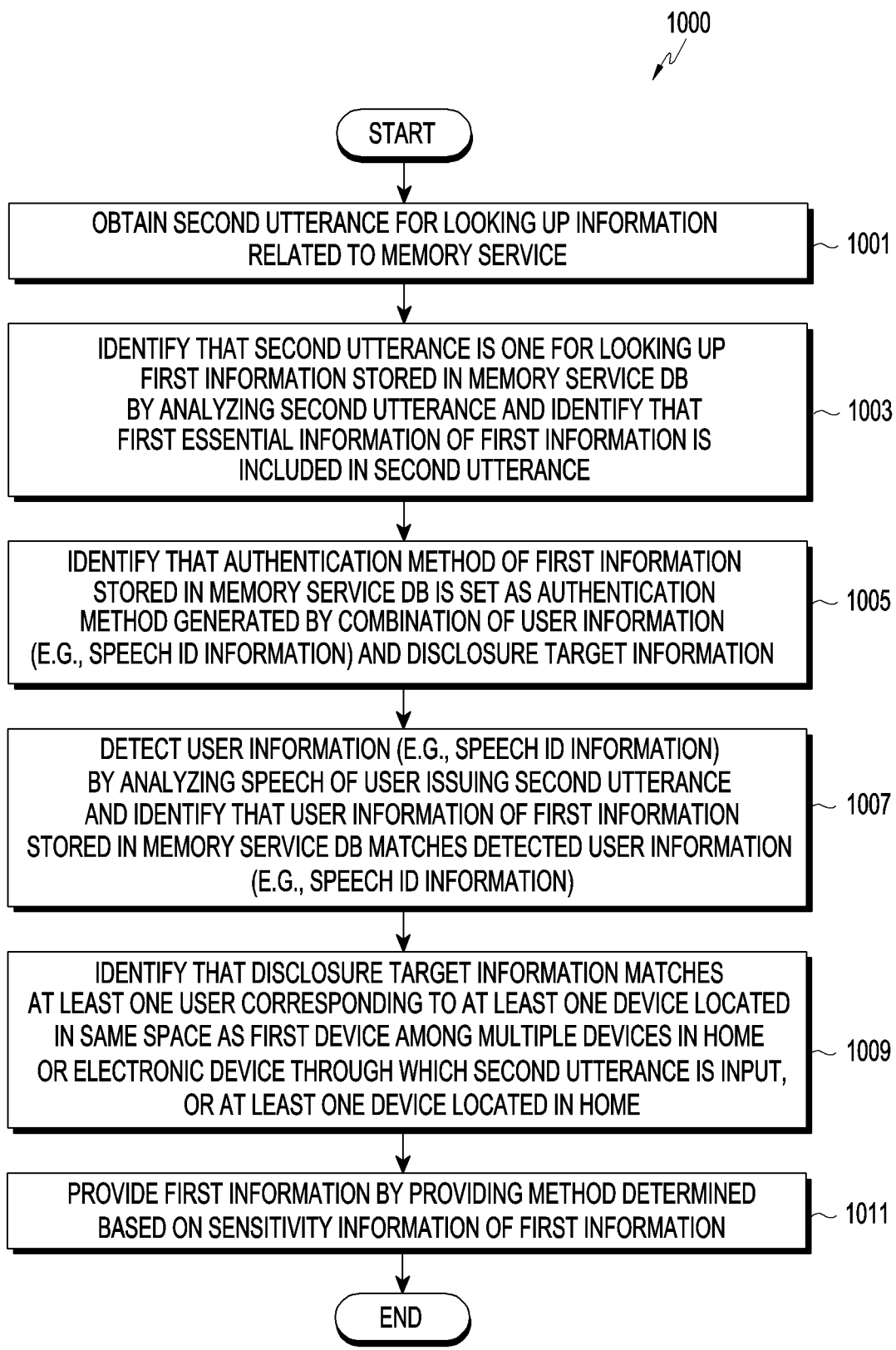
FIG. 10 illustrates a flowchart of a method for authenticating first information for a memory service by an electronic device according to an embodiment of this disclosure.

FIG. 10 illustrates a flowchart 1000 of a method for authenticating first information for a memory service by an electronic device according to an embodiment of this disclosure. The authentication method may include operations 1001 to 1011. According to an embodiment, at least one of operations 1001 to 1011 may be omitted or changed in order or may add other operations.

In operation 1001, an electronic device (e.g., the electronic device 101 of FIG. 1, the electronic device 201 of FIG. 2, or the electronic device 301 of FIG. 3) may obtain a second utterance for looking up information related to a memory service.

According to an embodiment, the electronic device may analyze the utterance and, upon detecting a phrase, such as "in the memory service" and/or "let me know" from the analyzed utterance, determine that the utterance is a second utterance for looking up the information related to the memory service.

In operation 1003, the electronic device (e.g., the electronic device 101 of FIG. 1, the electronic device 201 of FIG. 2, or the electronic device 301 of FIG. 3) may analyze the second utterance. The electronic device may also identify that the second utterance is a second utterance for looking up the first information stored in the memory service DB and identify that the first essential information of the first information is included in the second utterance.

In operation 1005, the electronic device (e.g., the electronic device 101 of FIG. 1, the electronic device 201 of FIG. 2, or the electronic device 301 of FIG. 3) may identify that the authentication method for the first information stored in the memory service DB is set as an authentication method generated by a combination of user information (e.g., speech ID information) and disclosure target information.

In operation 1007, the electronic device (e.g., the electronic device 101 of FIG. 1, the electronic device 201 of FIG. 2, or the electronic device 301 of FIG. 3) may analyze the speech of the user who has issued the second utterance, detect the user information (e.g., speech ID information), and identify that the user information of the first information stored in the memory service DB matches the detected user information (e.g., speech ID information).

According to an embodiment, the electronic device may analyze the speech of the user who has issued the second utterance and, if the speech ID corresponding to the analyzed speech matches the user information (e.g., speech id) of the first information stored in the memory service DB of the memory (e.g., the memory 330 of FIG. 2), identify that primary authentication is complete.

In operation 1009, the electronic device (e.g., the electronic device 101 of FIG. 1, the electronic device 201 of FIG. 2, or the electronic device 301 of FIG. 3) may identify that the disclosure target information matches at least one user corresponding to at least one device located in the same space as the first device through which the second utterance has been input among the plurality of devices in the home or the electronic device through which the second utterance has been input or at least one device located in the home.

According to an embodiment, upon identifying that a device currently detected in the home at the time of obtaining the second utterance or a device connected via short-range communication in the same space (e.g., a room) as the first device among the plurality of devices in the home or the electronic device through which the second utterance has been input at the time of obtaining the second utterance is the device of the disclosure target information (e.g., "son"), the electronic device may identify that final authentication is complete.

According to an embodiment, if at least one device currently detected in the home or at least one device connected via short-range communication in the same space (e.g., a room) as the first device among the plurality of devices in the home or the electronic device through which the second utterance has been input includes a device (e.g., a device of a family member) other than the device of the disclosure target information (e.g., "son"), the electronic device may identify an authentication failure.

In operation 1011, the electronic device (e.g., the electronic device 101 of FIG. 1, the electronic device 201 of FIG. 2, or the electronic device 301 of FIG. 3) may provide the first information by the providing method determined based on the sensitivity information of the first information.

Figure 11A:
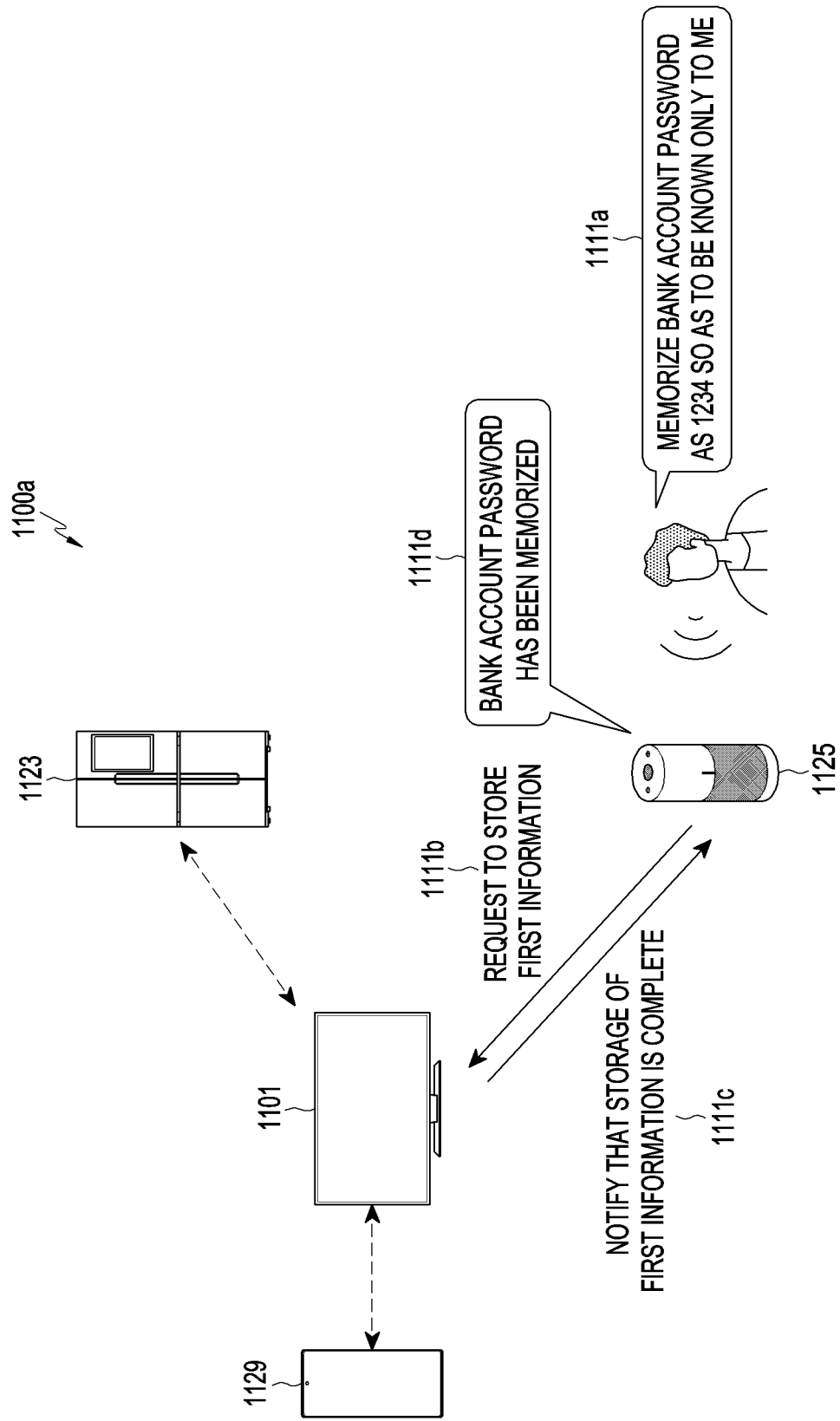
FIGS. 11A and 11B illustrate flowcharts of a memory service for providing first information by an electronic device according to an embodiment of this disclosure.
Figure 11B:
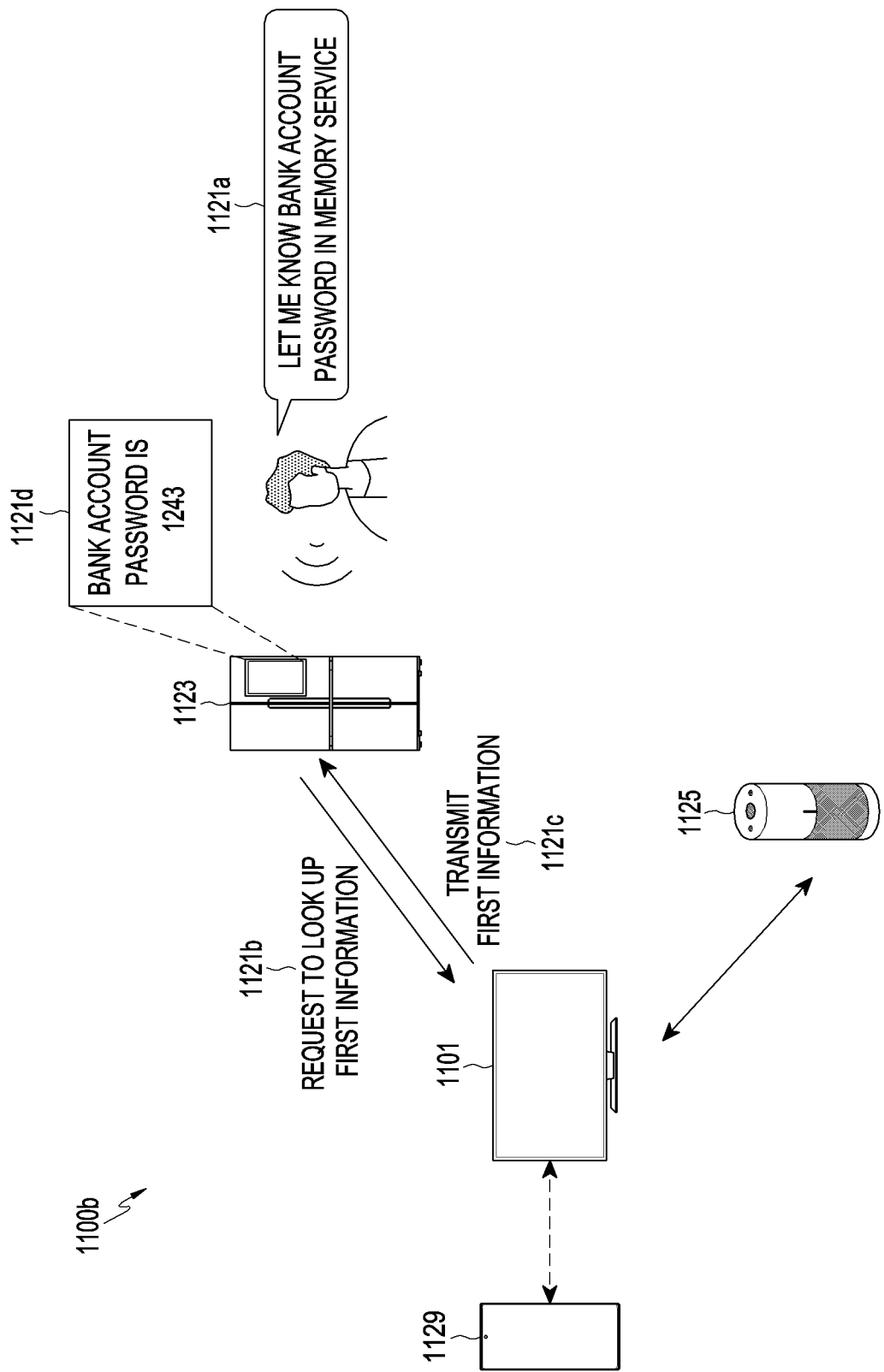

FIGS. 11A and 11B illustrate flowcharts 1100a and 1100b illustrating a memory service for providing first information by an electronic device according to an embodiment of this disclosure.

Referring to FIG. 11A, a first device 1125 (e.g., the AI speaker 225 of FIG. 2) among a plurality of devices 1123, 1125, and 1129 in the home, connected with an electronic device 1101 (e.g., the electronic device 101 of FIG. 1, the electronic device 201 of FIG. 2, or the electronic device 301 of FIG. 3) via a network may identify the user's input of first utterance 1111a saying "Memorize the bank account password as 1234 so as to be known only to me." The first device 1125 may process the first utterance into text data using an automatic speech recognition (ASR) system and transmit a message requesting to store the first information corresponding to the first utterance along with the first utterance which has been processed into the text data to the electronic device 1101 (1111b).

The electronic device 1101 may detect first essential information (e.g., bank account password) and second essential information (e.g., 1234) from the first utterance.

The electronic device 1101 may identify that "me" detected from the first utterance is "son" based on the family member DB stored in the memory (e.g., the memory 330 of FIG. 2) and analysis of the user's speech information received from the first device 1125 and detect disclosure target information (e.g., son) of the first information. The electronic device 1101 may set sensitivity information (e.g., "high") based on the disclosure target information (e.g., son). The electronic device 1101 may identify the speech ID (e.g., a3) of "son" corresponding to the disclosure target information (e.g., son) as user information, based on the family member DB stored in the memory (e.g., the memory 330 of FIG. 2) and analysis of the speech information for the user who has issued the first utterance, received from the first device 1125. The electronic device may set one of at least one authentication method generated by a combination of the disclosure target information (e.g., son) and the user information (e.g., the son's speech ID (e.g., a3)) as the authentication method for the first information (e.g., an authentication method via user information).

The electronic device 1101 may store the first information including the first essential information (e.g., bank account password), second essential information (e.g., 1234), disclosure target information (e.g., son), sensitivity information (e.g., "high"), user information (e.g., the son's speech ID (e.g., a3)), authentication method (e.g., an authentication method via user information), and save time information (e.g., 10 AM on November 23) in the memory service DB of the memory (e.g., the memory 330 of FIG. 2).

The electronic device 1101 may transmit a message indicating that the first information for the first utterance has been completely stored to the first device 1125 (1111c).

Upon receiving the message indicating that the first information corresponding to the first utterance has been completely stored from the electronic device 1101, the first device 1125 may output a voice message 1111d saying "The bank account password has been memorized."

Referring to FIG. 11B, a second device 1123 (e.g., the refrigerator 223 of FIG. 2) among a plurality of devices 1123, 1125, and 1129 in the home, connected with the electronic device 1101 (e.g., the electronic device 101 of FIG. 1, the electronic device 201 of FIG. 2, or the electronic device 301 of FIG. 3) via a network may identify the user's input of second utterance 1121a saying "Memorize the bank account password in the memory service."

The second device 1123 may process the second utterance into text data using an automatic speech recognition (ASR) system and transmit a message requesting to look up the first information corresponding to the second utterance along with the second utterance, which has been processed into the text data, to the electronic device 1101 (1121b).

Upon identifying that the "bank account password" detected from the second utterance is the same as the first essential information (e.g., bank account password) of the first information stored in the memory service DB stored in the memory (e.g., the memory 330 of FIG. 2) by analyzing the second utterance, the electronic device 1101 may identify the authentication method of the first information. The electronic device 1101 may analyze the user's speech information received from the second device 1123 according to the authentication method of the first information (e.g., an authentication method via user information) and, upon identifying that the user's user information (e.g., speech id) is the same as the user information (e.g., the speech ID (e.g., a3) of the "son") of the first information, complete authentication and identify that the user is the disclosure target information (e.g., "son"). The electronic device 1101 may determine a providing method for the first information (e.g., a providing method via a display) based on the sensitivity information (e.g., "high") of the first information and transmit, to the second device 1123, the providing method for the first information (e.g., a providing method via a display) and the essential information of the first information (e.g., the first essential information (e.g., bank account password) and/or second essential information (e.g., 1234)) (1121c).

Upon receiving the providing method for the first information (e.g., a providing method via a display) and the essential information of the first information (e.g., the first essential information (e.g., bank account password) and/or second essential information (e.g., 1234)) from the electronic device 1101, the second device 1123 may output a message saying "The bank account password is 1234" on the display of the second device 1123 (1121d).

Figure 12A:
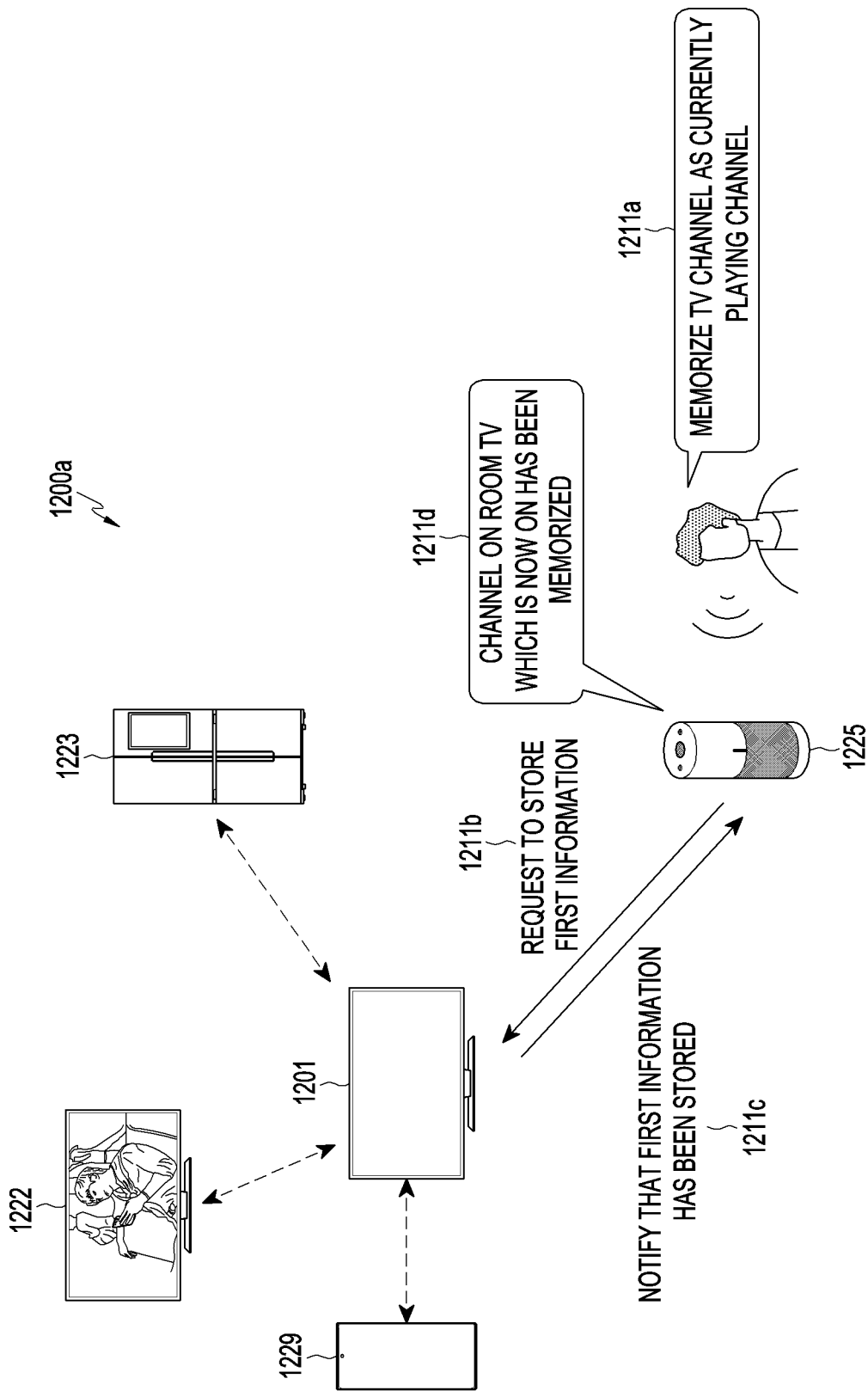
FIGS. 12A, 12B, and 12C illustrate flowcharts of a storage service for providing first information by an electronic device according to an embodiment of this disclosure.
Figure 12B:
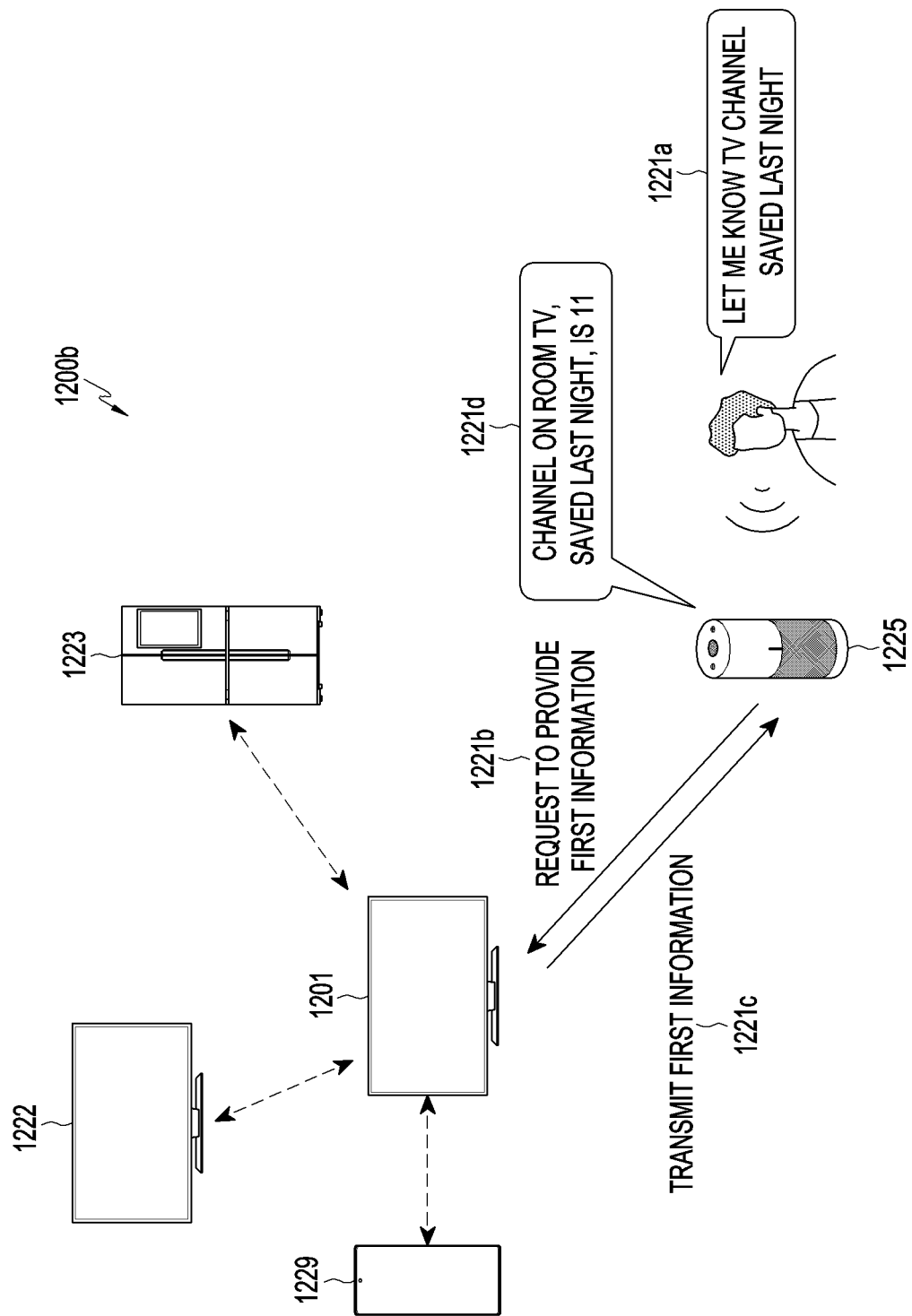
Figure 12C:
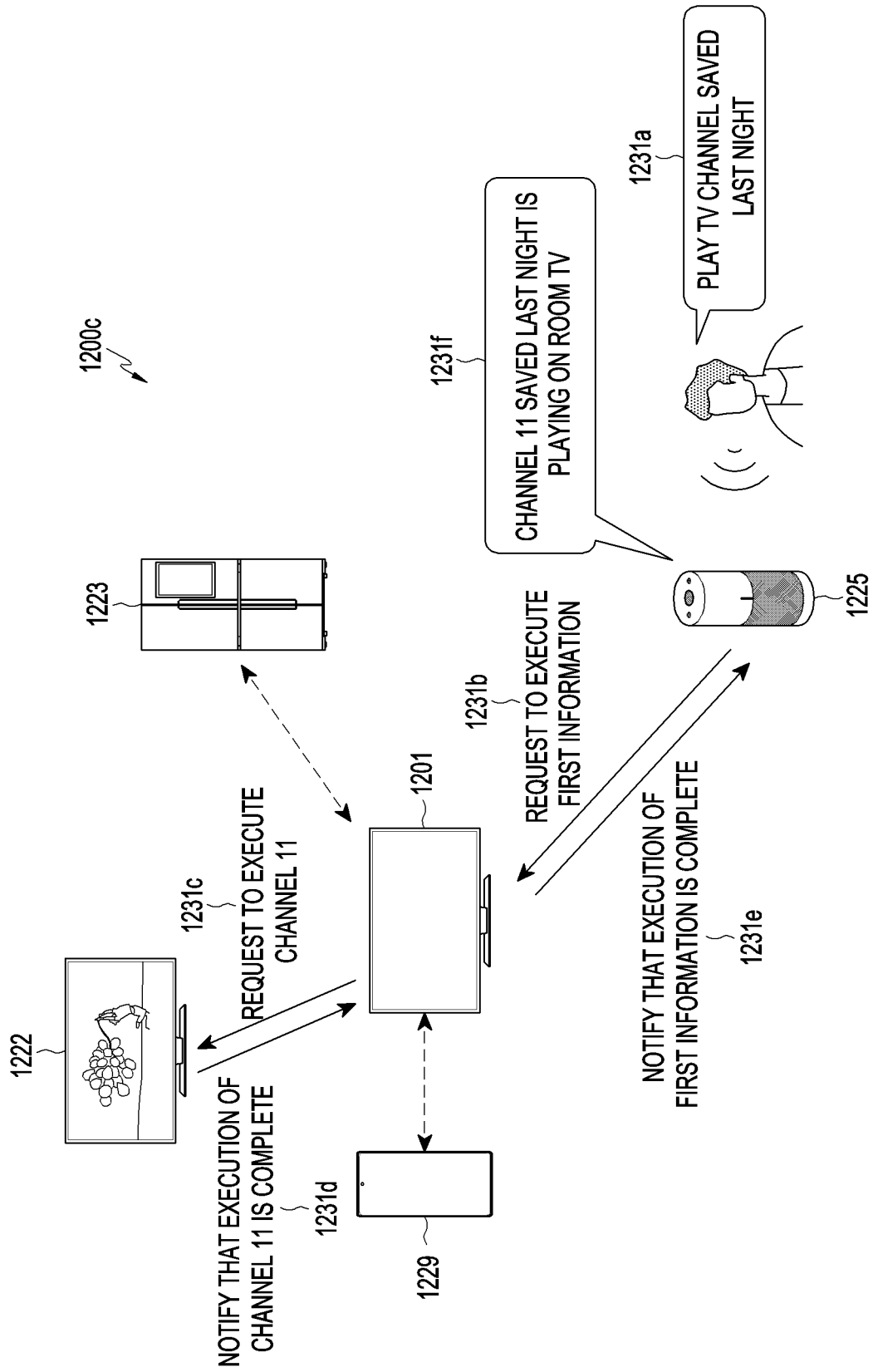

FIGS. 12A to 12C illustrate flowcharts 1200a to 1200c illustrating a memory service for providing first information by an electronic device according to an embodiment of this disclosure.

Referring to FIG. 12A, a first device 1225 (e.g., the AI speaker 225 of FIG. 2) among a plurality of devices 1222, 1223, 1225, and 1229 in the home, connected with an electronic device 1201 (e.g., the electronic device 101 of FIG. 1, the electronic device 201 of FIG. 2, or the electronic device 301 of FIG. 3) via a network may identify the user's input of first utterance 1211a saying "Memorize the TV channel as the current channel." The first device 1225 may process the first utterance into text data using an automatic speech recognition (ASR) system and transmit a message requesting to store the first information corresponding to the first utterance along with the first utterance which has been processed into the text data to the electronic device 1201 (1211b).

The electronic device 1201 may detect the first essential information (e.g., TV channel) of the first information from the first utterance, obtain identification information for the third device 1222 which is currently in an on state and state information (e.g., channel 11) for the third device based on the device name (e.g., TV device) and device state name (e.g., channel) in the first essential information (e.g., TV channel), and detect the obtained identification information and state information (e.g., channel 11) for the third device as second essential information of the first information.

If all of the family members are in the home at the time of obtaining the first utterance, the electronic device 1201 may determine the disclosure target information (e.g., all) of the first information and set sensitivity information (e.g., "low") based on the disclosure target information (e.g., all). The electronic device 1201 may identify the user information (e.g., speech ID (e.g., a1, a2, and a3) for each of the family members (e.g., dad, mom, and son) corresponding to the disclosure target information (e.g., all) as the user information, based on the family member DB stored in the memory (e.g., the memory 330 of FIG. 2) and analysis of the speech information for the user who has issued the first utterance, received from the first device 1225. The electronic device 1201 may set one of at least one authentication method generated by a combination of the user information (e.g., the speech ID (e.g., a1, a2, and a3) of each of the family members (e.g., dad, mom, and son)) and the disclosure target information (e.g., all) as an authentication method of the first information (e.g., an authentication method via user information).

The electronic device 1201 may store the first information including the first essential information (e.g., TV channel), second essential information (e.g., the identification information for the third device 1222 and the state information (e.g., channel 11) for the third device), disclosure target information (e.g., all), sensitivity information (e.g., "low"), user information (e.g., the speech ID (e.g., a1, a2, and a3) of each of the family members (e.g., dad, mom, and son)), authentication method (e.g., an authentication method via user information), and save time information (e.g., 9 PM on November 23) in the memory service DB of the memory (e.g., the memory 330 of FIG. 2).

The electronic device 1201 may transmit a message indicating that the first information for the first utterance has been completely stored to the first device 1225 (1221c).

Upon receiving the message indicating that the first information for the first utterance has been completely stored from the electronic device 1201, the first device 1225 may output a voice message 1211d saying "The channel on the room TV which is now on has been memorized.

Referring to FIG. 12B, a first device 1225 (e.g., the AI speaker 225 of FIG. 2) among a plurality of devices 1222, 1223, 1225, and 1229 in the home, connected with an electronic device 1201 (e.g., the electronic device 101 of FIG. 1, the electronic device 201 of FIG. 2, or the electronic device 301 of FIG. 3) via a network may identify the user's input of second utterance 1221a saying "Let me know the TV channel saved last night."

The first device 1225 may process the second utterance into text data using an automatic speech recognition (ASR) system and transmit a message requesting to look up the first information corresponding to the second utterance along with the second utterance, which has been processed into the text data, to the electronic device 1201 (1221b).

The electronic device 1201 may analyze the second utterance and identify the first information including the first essential information (e.g., TV channel) and save time information (e.g., 9 PM on November 23) in the memory service DB stored in the memory (e.g., the memory 330 of FIG. 2), based on the "TV channel" and "last night" detected from the second utterance. The electronic device 1201 may identify the authentication method of the first information, analyze the user's speech information received from the first device 1225 according to the authentication method of the first information (e.g., an authentication method via user information) and, upon identifying that the user information (e.g., speech id) for the user is identical to the user information (e.g., speech id) of the first information (e.g., the user information for the son among the respective speech ids (e.g., a1, a2, and a3) of all the family members (e.g., dad, mom, and son), complete authentication and identify that the user is included in the disclosure target information (e.g., "all"). The electronic device 1201 may determine a providing method for the first information (e.g., a providing method via a speaker and/or a display) based on the sensitivity information (e.g., "low") of the first information and transmit, to the first device 1225, the providing method for the first information (e.g., a providing method via a speaker and/or a display) and the essential information of the first information (e.g., the first essential information (e.g., TV channel) and/or second essential information (e.g., channel 11)) (1221c).

Upon receiving the providing method of the first information (e.g., a providing method via a speaker and/or a display) and the essential information of the first information (e.g., the first essential information (e.g., TV channel) and/or second essential information (e.g., channel 11)) from the electronic device 1201, the first device 1125 with no display may output a message saying, "The TV channel on the room TV saved last night is 11," through a speaker (1221d).

Referring to FIG. 12C, a first device 1225 (e.g., the AI speaker 225 of FIG. 2) among a plurality of devices 1222, 1223, 1225, and 1229 in the home, connected with an electronic device 1201 (e.g., the electronic device 101 of FIG. 1, the electronic device 201 of FIG. 2, or the electronic device 301 of FIG. 3) via a network may identify the user's input of second utterance 1231a saying "Play the TV channel saved last night."

The first device 1225 may process the second utterance into text data using an automatic speech recognition (ASR) system and transmit a message requesting to execute the first information corresponding to the second utterance along with the second utterance, which has been processed into the text data, to the electronic device 1201 (1231b).

The electronic device 1201 may analyze the second utterance and identify the first information including the first essential information (e.g., TV channel) and save time information (e.g., 9 PM on November 23) in the memory service DB stored in the memory (e.g., the memory 330 of FIG. 2), based on the "TV channel" and "last night" detected from the second utterance. The electronic device 1201 may identify the authentication method of the first information, analyze the user's speech information received from the first device 1225 according to the authentication method of the first information (e.g., an authentication method via user information) and, upon identifying that the user information (e.g., speech id) for the user is identical to the user information (e.g., speech id) of the first information (e.g., the user information for the son among the respective speech ids (e.g., a1, a2, and a3) of all the family members (e.g., dad, mom, and son), complete authentication. The electronic device 201 may identify the second essential information of the first information (e.g., the identification information for the third device and the state information (e.g., channel 11) for the third device) and request the third device 1222 to execute channel 11 (1231c). If the third device 122 is powered off, the electronic device 1201 may request the third device 1222 to power and execute channel 11.

Upon receiving a request for executing channel 11 from the electronic device 1201, the third device 1222 may play channel 11 and transmit a message indicating that the execution of channel 11 is complete to the electronic device 1201 (1231*d*).

Upon receiving the message indicating that the execution of channel 11 has been complete from the third device 1222, the electronic device 1201 may transmit a message indicating that the execution of the first information is complete to the first device 1225 (1231*e*).

Upon receiving the message indicating that the execution of the first information is complete from the electronic device 1201, the first device 1225 may output a message saying "Channel 11 saved last night is playing on the room TV" through the speaker (1231*f*).

According to an embodiment, a method for providing a memory service by an electronic device comprises, upon obtaining a first utterance related to a memory service, preparing to store first information for the memory service for the first utterance and storing the first information including essential information, sensitivity information for the first information, and an authentication method for the first information, detected from the first utterance, obtaining a second utterance for looking up information related to the memory service, upon identifying that the obtained second utterance is one for looking up the first information, completing authentication based on the authentication method, and providing the essential information by a providing method determined based on the sensitivity information.

According to an embodiment, wherein the first information further includes, disclosure target information of the first information, user information for identifying a user entering the first utterance, time information indicating a time of saving the first information, and/or password information that may be included in the first utterance.

According to an embodiment, storing the first information may include detecting first essential information indicating a target to be memorized in the first utterance and second essential information indicating a state value of the target, as the essential information.

According to an embodiment, the method may further comprise, when first essential information indicating a target to be memorized in the first utterance includes a device name and a device state name, obtaining identification information for a device corresponding to the device name among a plurality of devices in a home and state information for a device corresponding to the device state name, and storing the device identification information and the device state information as second essential information indicating a state value of the target to be memorized, of the essential information.

According to an embodiment, the method may further comprise, when the first utterance includes disclosure target information, detecting the disclosure target information from the first utterance and including the detected disclosure target information in the first information, and when the first utterance does not include the disclosure target information, generating at least one piece of user information corresponding to at least one device located in the same space as the electronic device or at least one device located in the home, as disclosure target information, and including the generated disclosure target information in the first information.

According to an embodiment, storing the first information may include when the first information includes disclosure target information, setting a sensitivity level corresponding to the disclosure target information by referring to a sensitivity word database (DB) stored in the memory and storing the set sensitivity level as the sensitivity information of the first information, and when the first information does not include the disclosure target information, setting a sensitivity level corresponding to at least one word included in the first utterance by referring to the sensitivity word DB stored in the memory and storing the set sensitivity level as the sensitivity information of the first information.

According to an embodiment, the method may further comprise generating an authentication method by a combination of at least one piece of user information, disclosure target information, or password information included in the first information.

According to an embodiment, the method may further comprise, upon identifying that the second utterance is an utterance requesting to execute the first information, controlling a first device among a plurality of devices in a home to execute the first information.

According to an embodiment, the method may further comprise, upon receiving the first utterance from a first device among a plurality of devices in a home, storing the first information in the memory and notifying the first device that the storage of the first information is complete.

According to an embodiment, the method may further comprise, upon receiving the second utterance from a first device among a plurality of devices in a home, detecting the first information from the memory and transmitting the first information to the first device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

The invention claimed is:

1. An electronic device, comprising:
a communication module;
a memory; and
a processor configured to:
receive, from a first device supporting a speech service through the communication module, a first utterance related to a memory service, the first utterance being inputted into the first device;
in response to receiving the first utterance related to the memory service, prepare to store first information for the memory service for the first utterance,
store the first information including essential information, disclosure target information, sensitivity information for the first information, and an authentication method for the first information, detected from the first utterance, in the memory;
obtain a second utterance for looking up information related to the memory service,
in response to identifying that the obtained second utterance is an utterance for looking up the first information, complete authentication based on the authentication method, and
provide the essential information by a providing method determined based on the sensitivity information,
wherein the processor is further configured to:
identify whether the first utterance includes the disclosure target information;
based on identifying the first utterance includes the disclosure target information, include the identified disclosure target information in the first information; and
based on identifying the first utterance does not include the disclosure target information, generate user information corresponding to at least one device located in a home and connected with the first device via short-range communication, as disclosure target information, and include the generated disclosure target information in the first information,
wherein the processor is further configured to:
set, as a sensitivity level, a highest level among a plurality of levels included in the sensitivity information, based on the disclosure target information including only a user of the electronic device;
set, as the sensitivity level, a first level lower than the highest level among the plurality of levels, based on the disclosure target information including the user and a portion other than the user among family members included in a family member DB(database); and
set, as the sensitivity level, a second level lower than the first level among the plurality of levels, based on the disclosure target information including all of the family members including the user.

2. The electronic device of claim 1, wherein the first information further includes at least one of:
the disclosure target information of the first information,
user information for identifying a user entering the first utterance,
time information indicating a time of saving the first information, or
password information that can be included in the first utterance.

3. The electronic device of claim 1, wherein the processor is further configured to detect first essential information indicating a target to be memorized in the first utterance and second essential information indicating a state value of the target, as the essential information.

4. The electronic device of claim 1, wherein when first essential information indicating a target to be memorized in the first utterance includes a device name and a device state name the processor is configured to:
- obtain identification information for a device corresponding to the device name among a plurality of devices in the home and state information for a device corresponding to the device state name, and
- store the device identification information and the device state information as second essential information indicating a state value of the target to be memorized, of the essential information.

5. The electronic device of claim 1, wherein:
- when the first information includes disclosure target information, the processor is configured to set the sensitivity level corresponding to the disclosure target information by referring to a sensitivity word database (DB) stored in the memory and store the set sensitivity level as the sensitivity information of the first information; and
- when the first information does not include the disclosure target information, the processor is configured to set a sensitivity level corresponding to at least one word included in the first utterance by referring to the sensitivity word DB stored in the memory and store the set sensitivity level as the sensitivity information of the first information.

6. The electronic device of claim 1, wherein the processor is further configured to generate the authentication method by a combination of at least one piece of user information, disclosure target information, or password information included in the first information.

7. The electronic device of claim 1, wherein in response to identifying that the second utterance is an utterance requesting to execute the first information, the processor is configured to control the first device among a plurality of devices in the home to execute the first information.

8. A method for providing a memory service by an electronic device, the method comprising:
- receiving, from a first device supporting a speech service through a communication module of the electronic device, a first utterance related to a memory service, the first utterance being inputted into the first device;
- in response to receiving the first utterance related to the memory service, preparing to store first information for the memory service for the first utterance;
- storing the first information including essential information, disclosure target information, sensitivity information for the first information, and an authentication method for the first information, detected from the first utterance;
- obtaining a second utterance for looking up information related to the memory service;
- in response to identifying that the obtained second utterance is an utterance for looking up the first information, completing authentication based on the authentication method; and
- providing the essential information by a providing method determined based on the sensitivity information,
- wherein the method further comprises:
  - identify whether the first utterance includes the disclosure target information;
  - based on identifying the first utterance includes the disclosure target information, including the identified disclosure target information in the first information; and
  - based on identifying the first utterance does not include the disclosure target information, generating user information corresponding to at least one device located in a home and connected with the first device via short-range communication, as disclosure target information, and including the generated disclosure target information in the first information, and
- wherein the method further comprises:
  - setting, as a sensitivity level, a highest level among a plurality of levels included in the sensitivity information, based on the disclosure target information including only a user of the electronic device;
  - setting, as the sensitivity level, a first level lower than the highest level among the plurality of levels, based on the disclosure target information including the user and a portion other than the user among family members included in a family member DB(database), and
  - setting, as the sensitivity level, a second level lower than the first level among the plurality of levels, based on the disclosure target information including all of the family members including the user.

9. The method of claim 8, wherein the first information further includes at least one of:
- the disclosure target information of the first information,
- user information for identifying a user entering the first utterance,
- time information indicating a time of saving the first information, or
- password information that can be included in the first utterance.

10. The method of claim 8, wherein storing the first information comprises detecting first essential information indicating a target to be memorized in the first utterance and second essential information indicating a state value of the target, as the essential information.

11. The method of claim 8, wherein when first essential information indicating a target to be memorized in the first utterance includes a device name and a device state name comprises:
- obtaining identification information for a device corresponding to the device name among a plurality of devices in the home and state information for a device corresponding to the device state name, and
- storing the device identification information and the device state information as second essential information indicating a state value of the target to be memorized, of the essential information.

12. The method of claim 8, wherein:
- when the first information includes disclosure target information, the method comprises:
  - setting the sensitivity level corresponding to the disclosure target information by referring to a sensitivity word database (DB) stored in a memory of the electronic device, and
  - storing the set sensitivity level as the sensitivity information of the first information; and
- when the first information does not include the disclosure target information, the method comprises setting
  - a sensitivity level corresponding to at least one word included in the first utterance by referring to the sensitivity word DB stored in the memory, and
  - storing the set sensitivity level as the sensitivity information of the first information.

13. The method of claim 8, further comprising generating the authentication method by a combination of at least one piece of user information, disclosure target information, or password information included in the first information.

* * * * *